(12) United States Patent  (10) Patent No.: US 7,969,463 B2
Takaki  (45) Date of Patent: Jun. 28, 2011

(54) THREE-DIMENSIONAL DISPLAY

(75) Inventor: Yasuhiro Takaki, Kawasaki (JP)

(73) Assignee: Japan Science and Technology Agency, Saitama (JP)

( * ) Notice: Subject to any disclaimer, the term of this patent is extended or adjusted under 35 U.S.C. 154(b) by 1301 days.

(21) Appl. No.: 10/594,032

(22) PCT Filed: Mar. 24, 2005

(86) PCT No.: PCT/JP2005/005369
§ 371 (c)(1),
(2), (4) Date: Sep. 25, 2006

(87) PCT Pub. No.: WO2005/093494
PCT Pub. Date: Oct. 6, 2005

(65) Prior Publication Data
US 2007/0188517 A1    Aug. 16, 2007

(30) Foreign Application Priority Data

Mar. 26, 2004  (JP) ................................ 2004-092075
Dec. 8, 2004   (JP) ................................ 2004-355172

(51) Int. Cl.
*H04N 13/04*  (2006.01)
*G02F 1/1335*  (2006.01)
(52) U.S. Cl. .......................................... 348/59; 349/15
(58) Field of Classification Search .................... 348/51, 348/59, 60; 349/15, 95
See application file for complete search history.

(56) References Cited

U.S. PATENT DOCUMENTS 5,633,737 A * 5/1997 Tanaka et al. .................... 349/95

(Continued)

FOREIGN PATENT DOCUMENTS

JP    A-09-236777    9/1997

(Continued)

OTHER PUBLICATIONS

Yasuhiro Takaki, Three-dimensional Display Using Modified Two-dimensionally Aligned Multiple Telecentric Optical Systems, The Journal of the Institute if Image Information and Television Engineers, vol. 57. No. 2, p. 293-300 (2003).

(Continued)

*Primary Examiner* — Gims S Philippe
(74) *Attorney, Agent, or Firm* — Morgan, Lewis & Bockius LLP

(57) ABSTRACT

An object of the present invention is to eliminate color non-uniformity and intensity non-uniformity on a three-dimensional image. The present invention provides a three-dimensional display comprising: a two-dimensional display, which comprises a plurality of color subpixels arranged in rows extending in a horizontal direction and in columns extending in a vertical direction which is substantially perpendicular to the horizontal direction, the color subpixels of red, green and blue being arranged periodically in the rows and the color subpixels of the same color being arranged in the columns; and a lenticular sheet provided on the two-dimensional display and having a plurality of cylindrical lenses through which the color subpixels are viewed and which extend in parallel with one another, the central axis of each cylindrical lens being inclined at an angle of θ to the column of the two-dimensional display, wherein, when a pitch of the color subpixels in the horizontal direction is $p_x$, a pitch of the color subpixels in the vertical direction is $p_y$, and a color subpixel group constituting one three-dimensional pixel is constituted by 3M×N number of color subpixels where 3M is the number of color subpixels in each row of one of the cylindrical lenses and N is the number of color subpixels in each column of one of the cylindrical lenses, a relationship, $\theta = \tan^{-1}(3p_x/Np_y)$, is satisfied.

36 Claims, 19 Drawing Sheets

U.S. PATENT DOCUMENTS

| | | | |
|---|---|---|---|
| 6,064,424 A | * | 5/2000 | van Berkel et al. ............ 348/51 |
| 6,859,240 B1 | * | 2/2005 | Brown et al. .................... 349/15 |
| 7,787,008 B2 | * | 8/2010 | Fukushima et al. ............ 348/51 |

FOREIGN PATENT DOCUMENTS

| | | |
|---|---|---|
| JP | 10-186294 | 7/1998 |
| JP | 2001-201073 | 1/2001 |
| JP | 2003-185968 | 7/2003 |

OTHER PUBLICATIONS

Takeshi Fukutomi, Hisaki Nate, and Yasuhiro Takaki, Accommodation Responses to 3D Images Consisting of Highly-Density Directional Images, The Journal of the Institute of Image Information and Television Engineers, vol. 58. No. 1, p. 69-74 (2004).

Cees van Berkel et al., "Characterisation and Optimisation of 3D-LCD Module Design," *Proceedings of SPIE*, 1997, vol. 3012, pp. 179-187.

* cited by examiner $p_y \tan \theta$

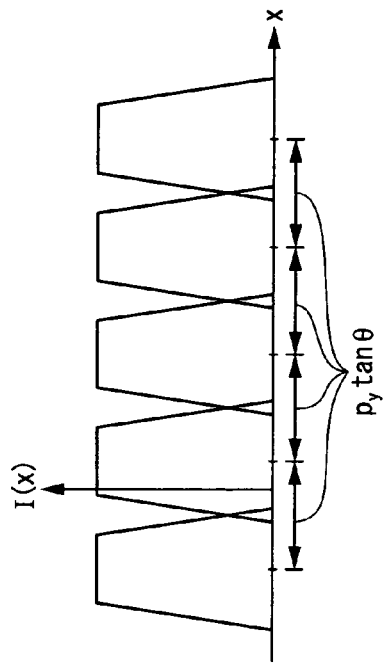
FIG.8C
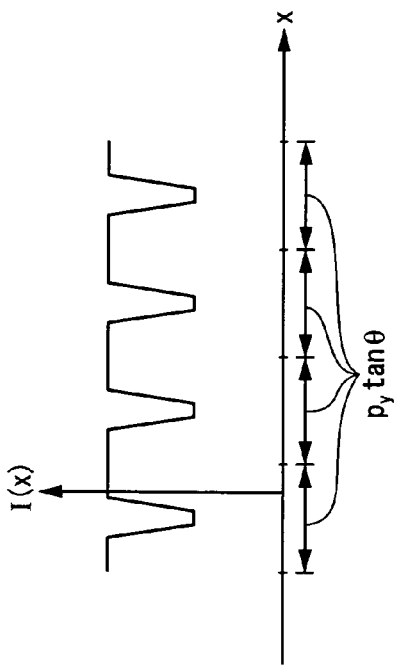
FIG.8D
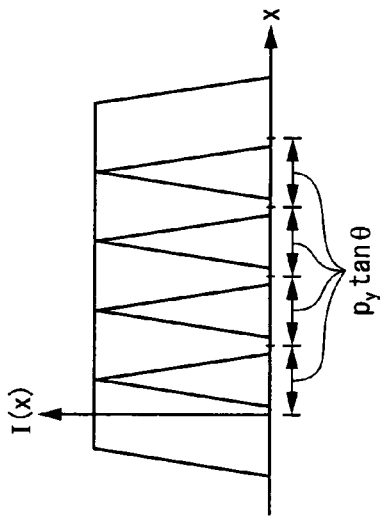
FIG.8A
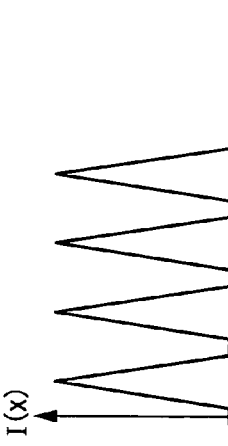
FIG.8B
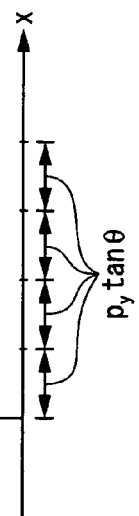

|  | TYPE I | TYPE II |
|---|---|---|
| N | 6 | 6 |
| M | 12 | 6 |
| THE NUMBER OF HORIZONTAL DISPLAY DIRECTIONS | 72 | 36 |
| THE NUMBER OF THREE-DIMENSIONAL PIXELS | 340 × 400 | 640 × 400 |

-10　　　　　　　0　　　　　　　+10　　[deg]

THREE-DIMENSIONAL DISPLAY

TECHNICAL FIELD

The present invention relates to a three-dimensional display system, and to a three-dimensional display using a lenticular sheet.

BACKGROUND ART

At present a binocular stereoscopic display system has been the mainstream as a three-dimensional display system. The principle of this binocular stereoscopic display system is to display different images to the right and left eyes so that one can obtain a three-dimensional aspect. This binocular stereoscopic display system is disadvantageous in that how an object looks like does not change when one moves his head and changes the viewing angle, that is, the binocular stereoscopic display system does not have motion parallax. Moreover, there is an inconsistency in that a focus of the eye, i.e. the accommodation point, is located on a screen on which images are displayed, and this position thereof does not correspond to the position of a three-dimensional object. It is believed that this inconsistency causes visual fatigue when viewing a three-dimensional image.

It is required for a three-dimensional display to provide more natural three-dimensional images. Such display can be realized by simultaneously displaying a large number of images in different horizontal directions. In a multi-view stereoscopic display system a plurality of view points are positioned in the horizontal direction in a space to display different images to the view points. By reducing the distance between view points to be narrower than the distance between both eyes, different images are displayed on the right and left eyes. Further, by increasing the number of view points, an image is switched to a different one when moving one's head, thus motion parallax can be obtained.

Recently, there has been proposed a method in which a large number of directional images, which are orthographic projection images of three-dimensional objects, are prepared for different projection directions without setting view points in a space, and images are displayed simultaneously with nearly parallel rays in corresponding directions (see, for example, "Three-dimensional Display Using Modified Two-dimensionally Aligned Multiple Telecentric Optical Systems", Yasuhiro Takaki, The Journal of the Institute of Image Information and Television Engineers, Vol. 57. No. 2, Pg. 293 through 300 (2003)). Natural motion parallax is obtained by increasing the number of directional images to be displayed. Particularly, there is a report describing that, if the number of directional images is 64, the eye can be focused on the three-dimensional image and thereby visual fatigue caused when observing the three-dimensional image can be resolved (see, for example, "Accommodation Responses to 3D Images Consisting of Highly-Density Directional Images", Takeshi Fukutomi, Hisaki Nate, and Yasuhiro Takaki, The Journal of the Institute of Image Information and Television Engineers, Vol. 58. No. 1, Pg. 69 through 74 (2004)).

As described above, in the three-dimensional display it is necessary to display a large number of images in the horizontal direction. The pixels, which comprise a display screen of the three-dimensional display and are disposed horizontally/vertically, need to have a large number of horizontal display directions and to control the light intensity and color of rays displayed in these horizontal directions. Such pixels are called "three-dimensional pixels".

As a method of constructing a three-dimensional display having a large number of horizontal display directions, there is known a method of combining a lenticular sheet with a two-dimensional display such as a liquid crystal panel. Here, the lenticular sheet is a sheet on which a large number of cylindrical lenses, which are one-dimensional lenses, are aligned in a direction perpendicular to the central axes of the lenses. The cylindrical lenses comprising the lenticular sheet are disposed so that the focal planes of the cylindrical lenses are located on a display screen of the liquid crystal panel. The display screen of the two-dimensional display consists of a number of pixels disposed horizontally/vertically, and three-dimensional pixels are composed of a plurality of pixels disposed in the horizontal direction and a corresponding cylindrical lens. A horizontal distance between the central axis of the cylindrical lens and each pixel determines a horizontal proceeding direction of a ray after the ray passes through the cylindrical lens, the ray being emitted from the pixel. Therefore, the number of horizontal display directions is equal to the number of pixels used horizontally. This construction method has a problem in which when the number of horizontal display directions is increased, the horizontal resolution of the three-dimensional display is extremely reduced and the horizontal resolution and the vertical resolution of a three-dimensional display become unbalanced.

A method which resolves the above problem is proposed (see U.S. Pat. No. 6,064,424). FIG. 1A is a figure showing a construction method of a conventional technology in which a lenticular sheet is disposed with an inclination in a vertical arranging direction of pixels. FIG. 1A shows a construction method to display color images, wherein the pixels in the figure are RGB color subpixels. One three-dimensional pixel is constructed using M×N number of pixels where M number of pixels are arranged in the horizontal direction and N number of pixels are arranged in the vertical direction, whereby M×N number of horizontal display directions are obtained. In this case, if the inclination angle of the lenticular sheet is θ, $\theta=\tan^{-1}(p_x/Np_y)$ is established, whereby the horizontal distances between all color subpixels and the central axes of cylindrical lenses can be set to values different from one another within the three-dimensional pixel. Here, $p_x$ is a horizontal pitch of color subpixels and $P_y$ is a vertical pitch of the color subpixels.

In the conventional technology shown in FIG. 1A, one three-dimensional pixel consists of seven color subpixels where N=2 and M=7/2 to realize seven horizontal display directions. In this manner, by tilting the lenticular sheets 3, the three-dimensional pixel can be composed of the color subpixels 2 not only in the horizontal directions but also in the vertical directions. Accordingly, it has been reported that the horizontal resolution of the three-dimensional display can be prevented from being reduced and the balance between the horizontal and vertical resolutions can be improved.

DISCLOSURE OF INVENTION

Problems to be Solved by the Invention

However, in the display method shown in FIG. 1A, one color subpixel corresponds to one horizontal display direction, hence the three-dimensional pixel displays only one of the three primary colors of RGB in one horizontal display direction. In particular, FIG. 1B shows a display color for the fourth horizontal display direction of the seven horizontal display directions. Therefore, as shown in FIG. 1B, there has been proposed a method of displaying full-color images by using a combination of three three-dimensional pixels.

When one views a screen of a three-dimensional display, as shown in FIG. 2, rays enter the eyes from a number of horizontal directions. In the display method disposed in U.S. Pat. No. 6,064,424, the color displayed by the three-dimensional pixel changes in the horizontal display direction, thus the problem pointed out is that color non-uniformity occurs in the three-dimensional image. Moreover, depending on the structure of the color subpixels, the maximum light intensity changes with respect to the horizontal display direction, thus the problem is that horizontal non-uniformity in the intensity occurs in a retinal image.

As described above, the known display method can display only one of the three primary colors and cannot display RGB full-color with one three-dimensional pixel. Another problem is that the light intensity changes according to the horizontal display directions due to the pixel structure, causing color non-uniformity and intensity non-uniformity in the three-dimensional image.

Moreover, conventionally the shape of a color subpixel in the two-dimensional display, that is represented by a liquid crystal display, was a rectangle, but recently a modified form such as a multidomain form has been used for the purpose of increasing the viewing angle. Therefore, the shape of the color subpixel of the two-dimensional display is not always appropriate for the three-dimensional display. For this reason, it is desired that the display panel, which is originally developed for the two-dimensional display, should be modified to be applied to the three-dimensional display.

Means for Solving the Problems

In view of such circumstances, the inventor of the present invention has achieved the present invention as a result of a keen study for solving the above problems. Specifically, according to a first aspect of the present invention, there is provided a three-dimensional display comprising: a two-dimensional display, which comprises a plurality of color subpixels arranged in rows extending in a horizontal direction and in columns extending in a vertical direction which is substantially perpendicular to the horizontal direction, the color subpixels of red, green and blue being arranged periodically in the rows, and the color subpixels of the same color being arranged in the columns; and a lenticular sheet provided on the two-dimensional display and having a plurality of cylindrical lenses through which the color subpixels are viewed and which are arranged in parallel with one another, the central axis of each cylindrical lens being inclined at an angle of θ to the column of the two-dimensional display, wherein, when a pitch of the color subpixels in the horizontal direction is $p_x$, a pitch of the color subpixels in the vertical direction is $p_y$, and a color subpixel group constituting one three-dimensional pixel includes 3M×N number of color subpixels where 3M is the number of color subpixels in each row corresponding to one of the cylindrical lenses and N is the number of color subpixels in each column corresponding to one of the cylindrical lenses, a relationship, $\theta=\tan^{-1}(3p_x/NP_y)$, is satisfied. According to such a configuration, in the three-dimensional display of the present invention, by using the two-dimensional display with the color subpixels arranged in the RGB stripe arrangement, all of the three colors can be displayed in each horizontal display direction of rays emitted from the three-dimensional pixel.

According to a preferred aspect of the present invention, in the three-dimensional display, the two-dimensional display that has color subpixels is selected from the group consisting of a liquid crystal display, an organic EL display, and a plasma display.

According to a preferred aspect of the present invention, in the three-dimensional display, the N is the multiples of 3. According to such a configuration, the color non-uniformity of rays emitted from the three-dimensional pixel can be eliminated in the horizontal display direction.

According to a preferred aspect of the present invention, in the three-dimensional display, $Np_y \leq 3Mp_x$ is satisfied.

According to a preferred aspect of the present invention, in the three-dimensional display, when a horizontal width and a vertical width of the color subpixels are w and h respectively, $w=3p_x/N$ is satisfied. According to such a configuration, the intensity non-uniformity of rays emitted from the three-dimensional pixel can be eliminated in the horizontal display direction.

According to a preferred aspect of the present invention, in the three-dimensional display, a value of the w is in a range of from $[1-(1/2)(h/p_y)](3p_x/N)$ to $[1+(h/p_y)](3p_x/N)$.

According to a preferred aspect of the present invention, in the three-dimensional display, a value of the h is the same or approximate to a value of the $p_y$. According to such a configuration, the light intensity variation of rays emitted from the three-dimensional pixel in the horizontal display direction can be decreased.

According to a preferred aspect of the present invention, in the three-dimensional display, when a maximum intensity distribution of rays emitted from one color subpixel is represented by a function f(s, t), and a straight line, which is in parallel with the central axis of each cylindrical lens and in which a horizontal distance between the straight line and the central axis is x, is represented by s=−t tan θ+x, a sum of the light intensities within a single color subpixel on the straight line is represented by:

$$I(x) = \int_{-\infty}^{\infty} f(-t\tan\theta + x, t)dt$$

the light intensity of the entire three-dimensional pixel in the horizontal display direction φ is provided by:

$$I_s(x) = \sum_i I(x + ip_y \tan\theta) \quad \text{(I)}$$

$$\phi = \tan^{-1}(x/f)$$

wherein f is a focal distance of the cylindrical lens, and each parameter is set so that the formula (I) becomes approximately a constant value independent of x.

Further, according to a second aspect of the present invention, there is provided a three-dimensional display comprising: a two-dimensional display, which comprises a plurality of color subpixels arranged in rows extending in a horizontal direction and in columns extending in a vertical direction which is substantially perpendicular to the horizontal direction, the color subpixels of red, green and blue being arranged periodically in the columns; and a lenticular sheet provided on the two-dimensional display and having a plurality of cylindrical lenses through which the color subpixels are viewed and which are arranged in parallel with one another, the central axis of each cylindrical lens being inclined at an angle of θ to the column of the two-dimensional display, wherein, when a pitch of the color subpixels in the horizontal direction is $p_x$, a pitch of the color subpixels in the vertical direction is $p_y$, and a color subpixel group constituting one three-dimensional pixel includes 3M×N number of color subpixels where 3M is the number of color subpixels in each row corresponding to one of the cylindrical lenses and N is the number of color subpixels in each column corresponding to one of the cylindrical lenses, a relationship, $\theta=\tan^{-1}[(1-3/N)p_x/p_y]$, is satisfied, where $p_x$ is a pitch of the color subpixels in the horizontal direction and $p_y$ is a pitch of the color subpixels in the vertical direction. According to such a configuration, in the three-dimensional display of the present invention, by using the two-dimensional display in which the color subpixels are arranged with an inclination, all of the three colors can be displayed in each horizontal display direction of rays emitted from the three-dimensional pixel.

According to a preferred aspect of the present invention, in the three-dimensional display, the two-dimensional display that has color subpixels is selected from the group consisting of a liquid crystal display, an organic EL display, and a plasma display.

According to a preferred aspect of the present invention, in the three-dimensional display, the N is the multiples of 3. According to such a configuration, the color non-uniformity of rays emitted from the three-dimensional pixel can be eliminated in the horizontal display direction.

According to a preferred aspect of the present invention, in the three-dimensional display, $Np_y<3Mp_x$ is satisfied.

According to a preferred aspect of the present invention, in the three-dimensional display, when a horizontal width and a vertical width of the color subpixels are w and h respectively, $w=3p_x/N$ is satisfied. According to such a configuration, the light intensity non-uniformity of rays emitted from the three-dimensional pixel can be eliminated in the horizontal display direction.

According to a preferred aspect of the present invention, in the three-dimensional display, the value of the w is within a range of:

$$\{1-(1/2)(N/3-1)(h/p_y)\}(3p_x/N) \leq w \leq \{1+(N/3-1)(h/p_y)\}(3p_x/N).$$

According to such a configuration, the light intensity variation of rays emitted from the three-dimensional pixel in the horizontal direction can be decreased.

According to a preferred aspect of the present invention, in the three-dimensional display, a value of the h is $3p_y/(N-3)$.

According to a preferred aspect of the present invention, in the three-dimensional display, when a maximum intensity distribution of rays emitted from one color subpixel is represented by a function f(s, t), and a straight line, which is in parallel with the central axis of each cylindrical lens and in which a horizontal distance between the straight line and the central axis is x, is represented by $s=-t\tan\theta+x$, a sum of the light intensities within a single subpixel on the straight line is represented by:

$$I(x) = \int_{-\infty}^{\infty} f(-t\tan\theta + x, t)dt$$

the light intensity of the entire three-dimensional pixel in the horizontal display direction $\phi$ is provided by:

$$I_s(x) = \sum_i I(x + i(p_x - p_y\tan\theta)) \qquad (II)$$

$$\phi = \tan^{-1}(x/f)$$

wherein f is a focal distance of the cylindrical lens, and each parameter is set so that the formula (II) becomes approximately a constant value independent of x.

Further, according to a third aspect of the present invention, there is provided a three-dimensional display comprising: a two-dimensional display, which comprises a plurality of color subpixels arranged in rows extending in a horizontal direction and in columns extending in a vertical direction which is substantially perpendicular to the horizontal direction, the color subpixels of red, green and blue being arranged periodically in the rows and the color subpixels of the same color being arranged in the columns; a lenticular sheet provided on the two-dimensional display and having a plurality of cylindrical lenses through which the color subpixels are viewed and which are arranged in parallel with one another; and an aperture array which is provided between the two-dimensional display and the lenticular sheet, and which has a plurality of apertures, the central axis of each cylindrical lens being inclined at an angle of $\theta$ to the column of the two-dimensional display, wherein when a pitch of the color subpixels in the horizontal direction is $p_x$, a pitch of the color subpixels in the vertical direction is $p_y$, a pitch of the apertures in the horizontal direction is $P_x'$, a pitch of the apertures in the vertical direction is $p_y'$, and when a color subpixel group constituting one three-dimensional pixel includes 3M×N number of color subpixels where 3M is the number of color subpixels in each row corresponding to one of the cylindrical lenses and N is the number of color subpixels in each column corresponding to one of the cylindrical lenses, relationships, $p_x=p_x'$, $p_y=p_y'$, and $\theta=\tan^{-1}(3p_x'/Np_y')$, are satisfied. In the third aspect of the present invention, by using the aperture array which has a certain relationship with the shape of each color subpixel, the divergence of the rays emitted from the color subpixels of the two-dimensional display can be limited and the most optimal color subpixels can be generated.

According to a preferred aspect of the present invention, in the three-dimensional display, the two-dimensional display that has color subpixels is selected from the group consisting of a liquid crystal display, an organic EL display, and a plasma display.

According to a preferred aspect of the present invention, in the three-dimensional display the N is the multiples of 3.

According to a preferred aspect of the present invention, in the configuration of the three-dimensional pixel in the three-dimensional display, $Np_y' \leq 3Mp_x$ is satisfied.

According to a preferred aspect of the present invention, in the three-dimensional display, when a horizontal width and a vertical width of the apertures are w' and h' respectively, $w'=3p_x'/N$ is satisfied.

According to a preferred aspect of the present invention, in the three-dimensional display, a value of the w' is within a range of from $[1-(1/2)(h'/p_y')](3p_x'/N)$ to $[1+(h'/p_y')](3p_x'/N)$.

According to a preferred aspect of the present invention, in the three-dimensional display, a value of the h' is the same as or approximate to the value of the $p_y'$.

According to a preferred aspect of the present invention, in the three-dimensional display, when a maximum intensity distribution of rays emitted from one aperture is represented by a function f(s, t), and a straight line, which is in parallel with the central axis of each cylindrical lens and in which a horizontal distance between the straight line and the central axis is x, is represented by $s=-t\tan\theta+x$, a sum of the light intensities within a single color subpixel on the straight line is represented by:

$$I(x) = \int_{-\infty}^{\infty} f(-t\tan\theta + x, t)dt$$

the light intensity of the entire three-dimensional pixel in the horizontal display direction φ is provided by:

$$I_s(x) = \sum_i I(x + ip'_y \tan\theta) \quad \text{(III)}$$

$$\phi = \tan^{-1}(x/f)$$

wherein f is a focal distance of the cylindrical lens, and each parameter is set so that the formula (III) becomes approximately a constant value independent of x.

According to a preferred aspect of the present invention, in the three-dimensional display, each of the color subpixels has a multidomain structure which is divided into top, bottom, right, and left sections.

According to a preferred aspect of the present invention, the three-dimensional display further comprises a diffuser disposed between the two-dimensional display and the aperture array.

Moreover, according to a fourth aspect of the present invention, there is provided a three-dimensional display comprising: a two-dimensional display, which comprises a plurality of color subpixels arranged in rows extending in a horizontal direction and in columns extending in a vertical direction which is substantially perpendicular to the horizontal direction, the color subpixels of red, green and blue being arranged periodically in the columns; a lenticular sheet provided on the two-dimensional display and having a plurality of cylindrical lenses through which the color subpixels are viewed and which are arranged in parallel with one another; and an aperture array which is provided between the two-dimensional display and the lenticular sheet and has a plurality of apertures, the central axis of each cylindrical lens being inclined at an angle of θ to the column of the two-dimensional display, wherein when a pitch of the color subpixels in the horizontal direction is $p_x$, a pitch of the color subpixels in the vertical direction is $p_y$, a pitch of the apertures in the horizontal direction is $p_x'$, a pitch of the apertures in the vertical direction is $p_y'$, and when a color subpixel group constituting one three-dimensional pixel includes 3M×N number of color subpixels where 3M is the number of color subpixels in each row corresponding to one of the cylindrical lenses and N is the number of color subpixels in each column corresponding to one of the cylindrical lenses, relationships, $p_x=p_x'$, $p_y=p_y'$, and $\theta=\tan^{-1}[(1-3/N)p_x'/p_y']$, are satisfied. In the fourth aspect of the present invention, by using the aperture array which has a certain relationship with the shape of each color subpixel, the divergence of the rays emitted from the color subpixels of the two-dimensional display can be limited and the most optimal color subpixels can be generated.

According to a preferred aspect of the present invention, in the three-dimensional display, the two-dimensional display that has color subpixels is selected from the group consisting of a liquid crystal display, an organic EL display, and a plasma display.

According to a preferred aspect of the present invention, in the three-dimensional display, the N is the multiples of 3.

According to a preferred aspect of the present invention, in the configuration of the three-dimensional pixel in the three-dimensional display, $Np_y' \leq 3Mp_x'$ is satisfied.

According to a preferred aspect of the present invention, in the three-dimensional display, when a horizontal width and a vertical width of the apertures are w' and h' respectively, $w'=3p_x'/N$ is satisfied.

According to a preferred aspect of the present invention, in the three-dimensional display, the value of the w' is within a range of:

$$\{1-(1/2)(N/3-1)(h/p'_y)\}(3'p_x/N) \leq w \leq \{1+(N/3-1)(h/p'_y)\}(3p'_x/N).$$

According to a preferred aspect of the present invention, in the three-dimensional display, a value of the h is $3p_y/(N-3)$.

According to a preferred aspect of the present invention, in the three-dimensional display, when a maximum intensity distribution of rays emitted from one aperture is represented by a function f(s, t), and a straight line, which is in parallel with the central axis of each cylindrical lens and in which a horizontal distance between the straight line and the central axis is x, is represented by s=−t tan θ+x, a sum of the light intensities within a single subpixel on the straight line is represented by:

$$I(x) = \int_{-\infty}^{\infty} f(-t\tan\theta + x, t)dt$$

the light intensity of the entire three-dimensional pixel in the horizontal display direction φ is provided by:

$$I_s(x) = \sum_i I(x + i(p'_x - p'_y \tan\theta)) \quad \text{(IV)}$$

$$\phi = \tan^{-1}(x/f)$$

wherein f is a focal distance of the cylindrical lens, and each parameter is set so that the formula (IV) becomes approximately a constant value independent of x.

According to a preferred aspect of the present invention, in the three-dimensional display, each of the color subpixels has a multidomain structure which is divided into top, bottom, right, and left sections.

According to a preferred aspect of the present invention, the three-dimensional display further comprises a diffuser disposed between the two-dimensional display and the aperture array.

Advantageous Effects of Invention

According to the present invention, a large number of different images can be displayed in different horizontal display directions, and the three-dimensional display in which color non-uniformity and intensity non-uniformity are eliminated can be obtained.

BRIEF DESCRIPTION OF DRAWINGS

FIG. 6 shows a relationship between the horizontal display direction and the maximum light intensity in a case where the shape of each color subpixels is a rectangle in the present invention, wherein

FIG. 8 shows a figure illustrating a condition in which the change in the light intensity of a single three-dimensional pixel in the horizontal display direction becomes 50%;

Figure 1A:
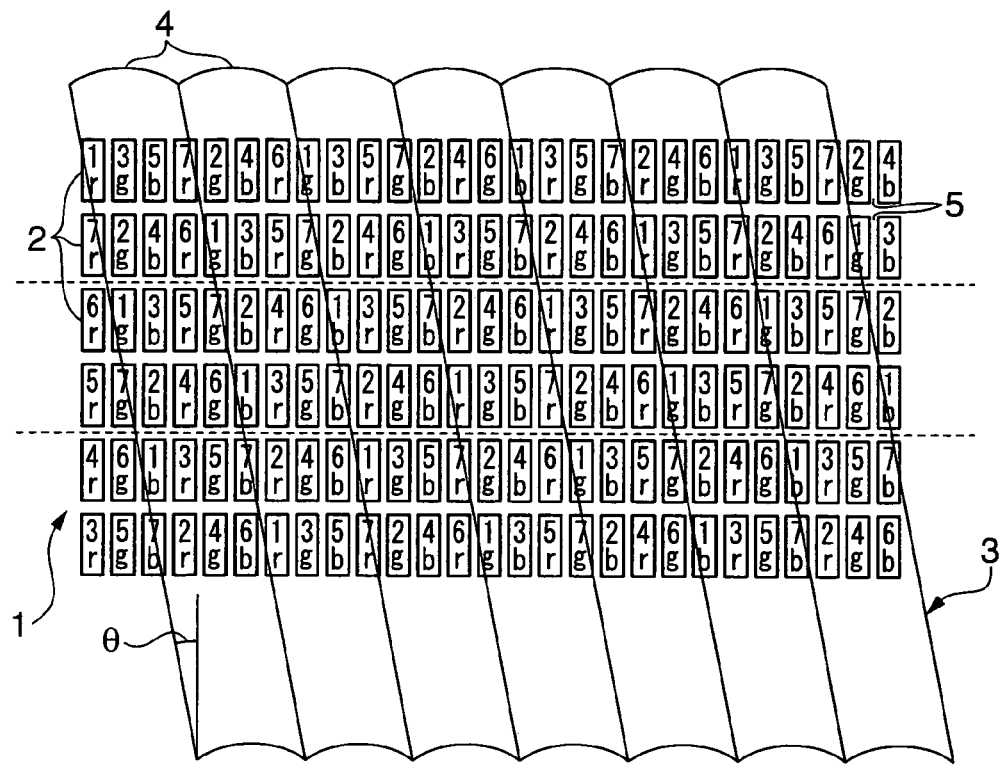
FIG. 1A shows a plan view which diagrammatically illustrates a relationship between a two-dimensional display and a lenticular sheet for displaying color three-dimensional images according to the prior art.
Figure 1B:
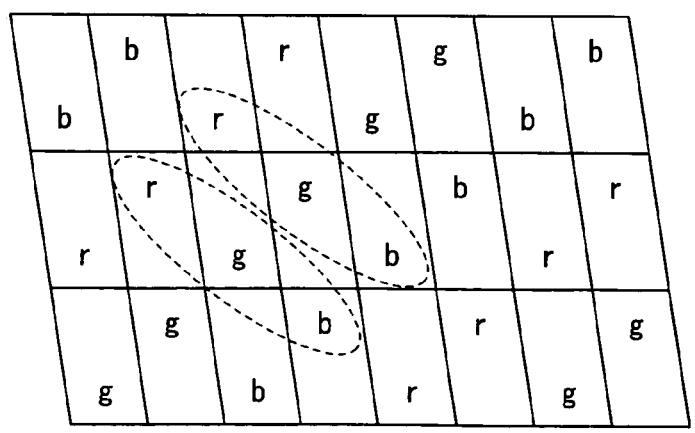
FIG. 1B shows a figure illustrating colors displayed in a specific horizontal direction from three-dimensional pixels.
Figure 2:
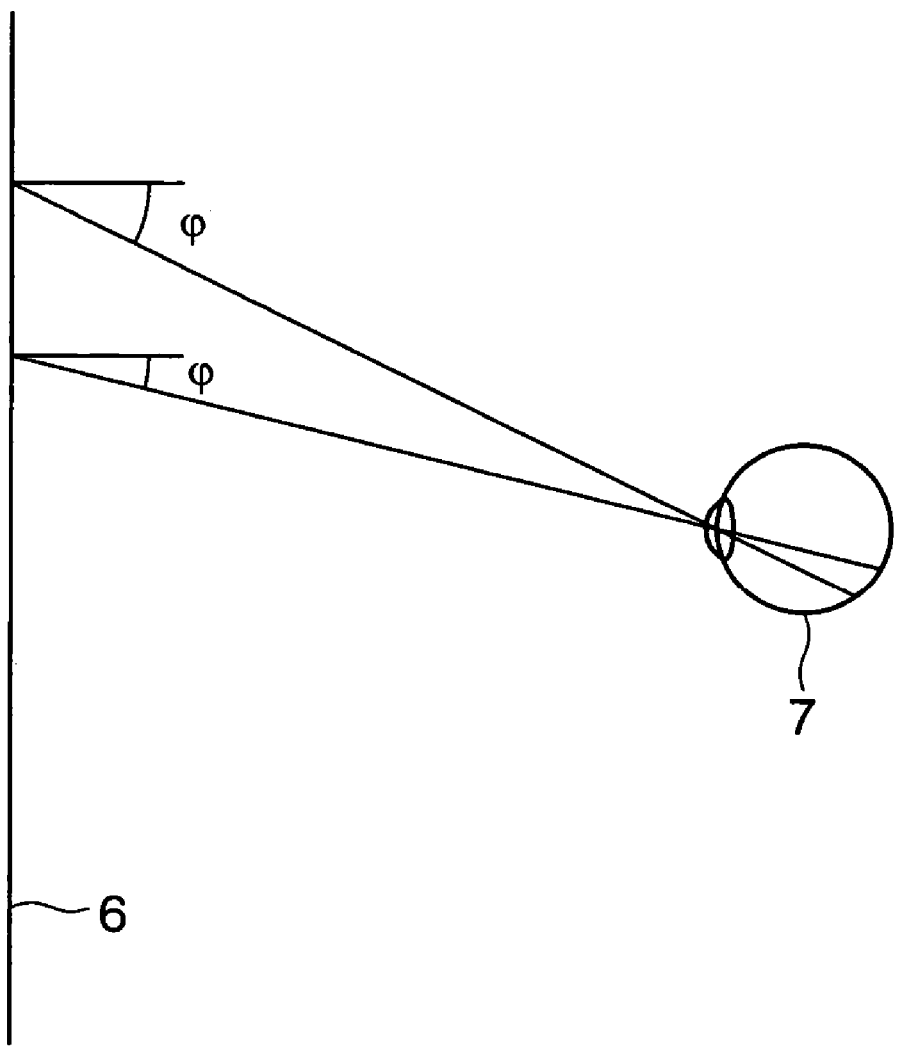
FIG. 2 shows a cross-sectional diagram which diagrammatically illustrates a relationship between a horizontal display direction and a retinal image in three-dimensional display.

1 . . . two-dimensional display, 2 . . . color subpixel, 3 . . . lenticular sheet, 4 . . . cylindrical lens, 5 . . . black matrix, 6 . . . three-dimensional screen, 7 . . . eye, 8 . . . central axis of cylindrical lens, 9 . . . vertical arrangement direction of color subpixels, 10 . . . color subpixel group constituting one three-dimensional pixel, 20; 50 . . . three dimensional display, 21 . . . plane perpendicular to display screen of three-dimensional display, 30 . . . aperture array, 35 . . . diffuser

BEST MODE FOR CARRYING OUR THE INVENTION

According to the present invention, the three-dimensional display which can display a number of different images in the different horizontal display directions and in which color non-uniformity and intensity non-uniformity are eliminated can be obtained.

Embodiments of the present invention are described with reference to the drawings. Although the following embodiments are examples for explaining the present invention, the present invention is not limited to these embodiments. The present invention can be implemented in various other embodiments without departing from the spirits of the invention. It should be noted that the same reference numbers are used throughout the entire drawings of the present specification in order to specify the same components.

The three-dimensional display according to the present invention comprises a two-dimensional display and a lenticular sheet disposed on the two-dimensional display.

(First Aspect of the Present Invention)

In the two-dimensional display used in the present invention, three types of 15 color subpixels corresponding to three primary colors of RGB are two-dimensionally disposed in the vertical direction and the horizontal direction in order to display a color image. In the first aspect of the present invention, the three types of color subpixels corresponding to three primary colors of RGB are disposed in the vertical direction, and the RGB color subpixels are periodically disposed in the RGB stripe arrangement in the horizontal direction. It should be noted that in the following explanation three colors of RGB are used for the color combination of subpixels, but the concept of the present invention can be applied to a case other than using the three colors, i.e. a case using four colors.

The two-dimensional display with a color subpixel structure, which is used in the present invention, is not limited to the following examples, thus a liquid crystal display, a plasma display, an organic EL display, or the like can be used as the two-dimensional display.

The lenticular sheet used in the present invention is a sheet which has a plurality of cylindrical lenses having an elongate cylinder shape, which are disposed in a direction perpendicular to the central axes of the cylindrical lenses.

In the present invention, one three-dimensional pixel is composed of the color subpixels, the number of which is three times the number of horizontal display directions, to realize the three-dimensional pixel capable of displaying a full-color image.

Figure 3:
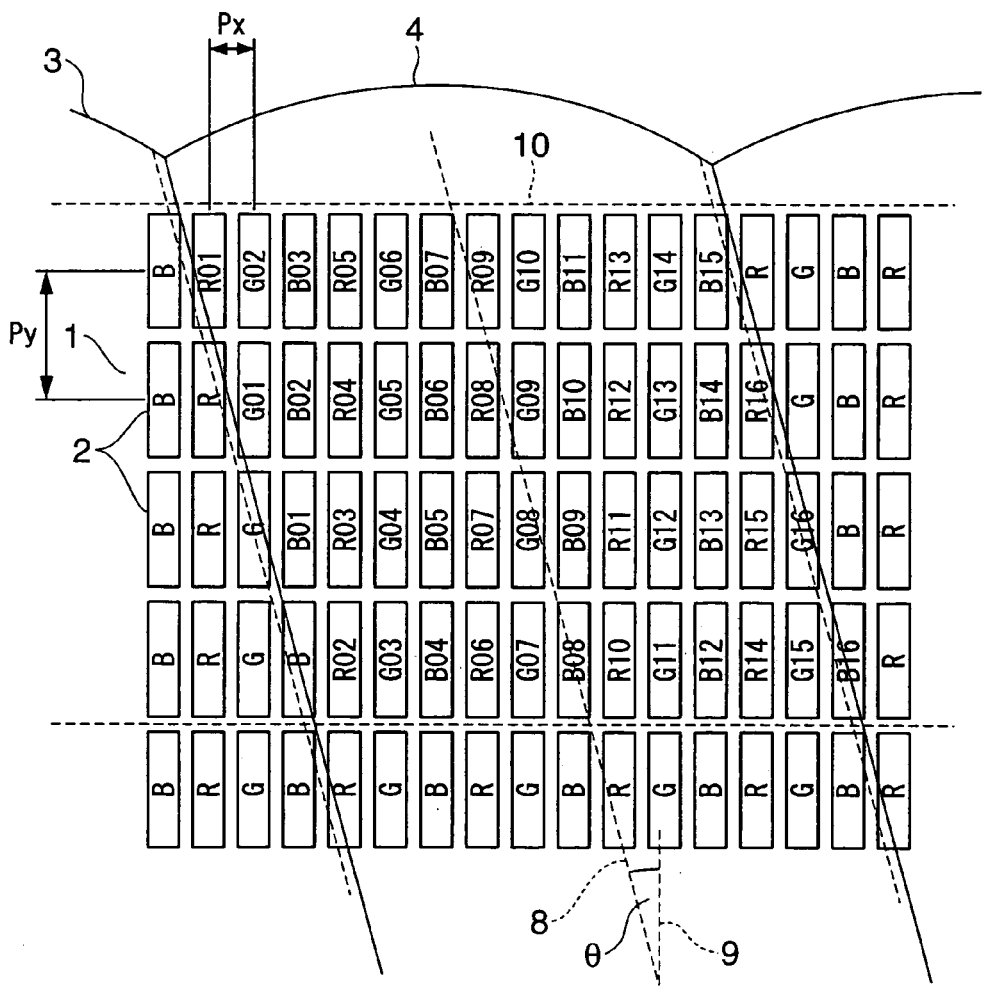
FIG. 3 shows a figure which schematically illustrates a construction of the three-dimensional pixels according to the first aspect of the present invention.

FIG. 3 schematically shows a construction of the three-dimensional pixel according to the present invention. In FIG. 3, a lenticular sheet 3 used in the present invention has, as described above, cylindrical lenses 4 which are one-dimensional lenses, wherein a plurality of the lenses are disposed in a direction perpendicular to the cylindrical lens central axes 8. The lenticular sheet 3 is disposed so that focal planes of the cylindrical lenses are located on a display screen of a two-dimensional display 1 on which color subpixels 2 are disposed.

Rays, which are emitted from one point on the display screen of the two-dimensional display, are displayed at an angle $\phi=\tan^{-1}(x/f)$, the point being at the distance x in the horizontal direction from the cylindrical lens 4 central axis 8. Here, f is a focal distance of the cylindrical lens and $\phi$ is a horizontal display direction of the ray emitted from the three-dimensional pixel. Therefore, by tilting the cylindrical lens central axis 8 to the vertical direction in which the color subpixels 2 are disposed, the color subpixels 2 of the same color, which are disposed at different vertical positions and at the same horizontal positions, are provided with different horizontal display directions.

Figure 4A:
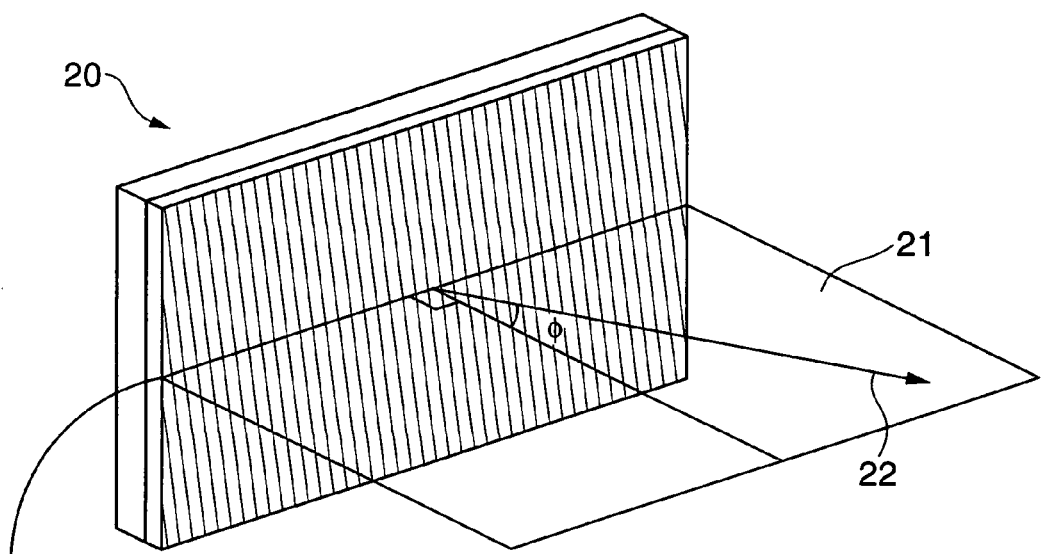
FIG. 4A shows a figure for explaining a horizontal display direction φ of a ray emitted from the three-dimensional pixels.
Figure 4B:
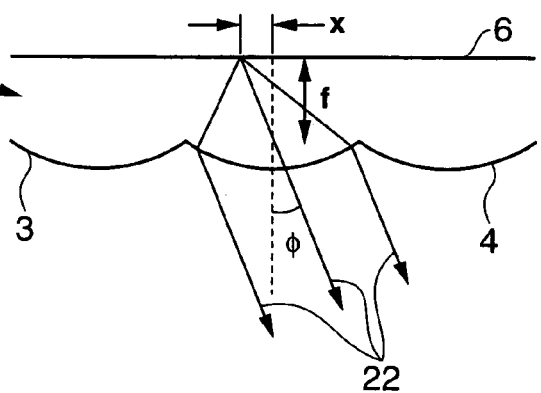
FIG. 4B shows a schematic drawing which illustrates an enlarged part of a plane 21 shown in FIG. 4A.

FIG. 4 shows a figure for explaining the horizontal display direction $\phi$. As shown in FIG. 4A, out of the rays which are emitted from a three-dimensional display 20, a ray 22 travels on a plane 21 which is perpendicular to the display screen of the three-dimensional display, at the angle of $\phi$ with respect to the normal of the display screen. FIG. 4B is a figure showing an enlarged part of the plane 21 and schematically shows the relationship among x, f and $\phi$.

As described above, in the present invention, one three-dimensional pixel is composed of 3M×N number of color subpixels where 3M is the number of color subpixels in the horizontal direction and N is the number of color subpixels in the vertical direction corresponding to a single cylindrical lens 4, as shown in FIG. 3. In this case, M×N number of color subpixels are used for each color of RGB colors. Note that FIG. 3 shows a case where M=4 and N=4.

The inclination angle $\theta$ of the cylindrical lens central axis with respect to the vertical arrangement direction of the color subpixels can be obtained as follows. Specifically, considering the horizontal distance from the cylindrical lens central axis, the horizontal distance changes by $p_y \tan\theta$ between color subpixels of the same color, whose vertical positions are different by one subpixel. When $Np_y \tan\theta$, which is a change in the horizontal distance corresponding to the N subpixels in the vertical direction, becomes equal to $3p_x$, which is a change in the horizontal distance between color subpixels of the same color on the same horizontal line, the horizontal distances of color subpixels of the same color within the three-dimensional pixel change at constant intervals. Therefore, when $Np_y \tan\theta=3p_x$, the inclination of the lenticular sheet $\theta$ is calculated as $\theta=\tan^{-1}(3p_x/Np_y)$.

In this case, for each one of RGB colors, the M×N number of color subpixels have horizontal distances different from one another with respect to the cylindrical lens central axes 8, and the values of the horizontal distances change at a constant interval of $p_y \tan\theta=3p_x/N$. Therefore, M×N horizontal display directions can be realized for each color of the RGB colors, and the intensity and color of rays displayed in these horizontal display directions can be controlled. In FIG. 3, 16 horizontal display directions are realized by using 12 color subpixels in the horizontal direction and 4 color subpixels in the vertical direction.

As described above, in the present invention, one three-dimensional pixel consists of 3M×N number of color subpixels where 3M is the number of color subpixels in the horizontal direction and N is the number of color subpixels in the vertical direction, and the inclination angle $\theta$ of the lenticular sheet is obtained as $\theta=\tan^{-1}(3p_x/Np_y)$, whereby full-color images can be displayed in M×N number of horizontal display directions.

On the other hand, in the prior art disclosed in U.S. Pat. No. 6,064,424, one three-dimensional pixel is composed of M×N number of color subpixels where M is the number of color subpixels in the horizontal direction and N is the number of color subpixels in the vertical direction, whereby M×N number of horizontal display directions are realized. For this reason, basically only one of the RGB colors is displayed in the single three-dimensional pixel. Moreover, the inclination angle $\theta$ is $\theta=\tan^{-1}(p_x/Np_y)$. Therefore, although only one type of color subpixels out of the RGB color subpixels correspond to a single horizontal display direction in the display method disclosed in U.S. Pat. No. 6,064,424, three color subpixels of all three RGB colors correspond to a single horizontal display direction in the display method according to the present invention.

The difference in the vertical positions of the RGB color subpixels displayed in the same horizontal direction within one three-dimensional pixel is approximately a vertical width ($Np_y$) of the three-dimensional pixel at a maximum. In order to make the three-dimensional pixel be recognized as one pixel and to prevent the difference between these vertical positions from being perceived, it is desired that a horizontal width ($3Mp_x$) of the three-dimensional pixel be equal to or larger than this maximum difference ($Np_y$) between the vertical positions. Specifically, it is desired that $Np_y \leq 3Mp_x$ be satisfied.

Since the color subpixel is not a dot, and the color subpixel itself has a certain size, hence the horizontal distance of one color subpixel with respect to the cylindrical lens central axis varies in a certain range. Consequently, the horizontal display direction corresponding to one color subpixel also varies in a certain angle width.

Figure 5:
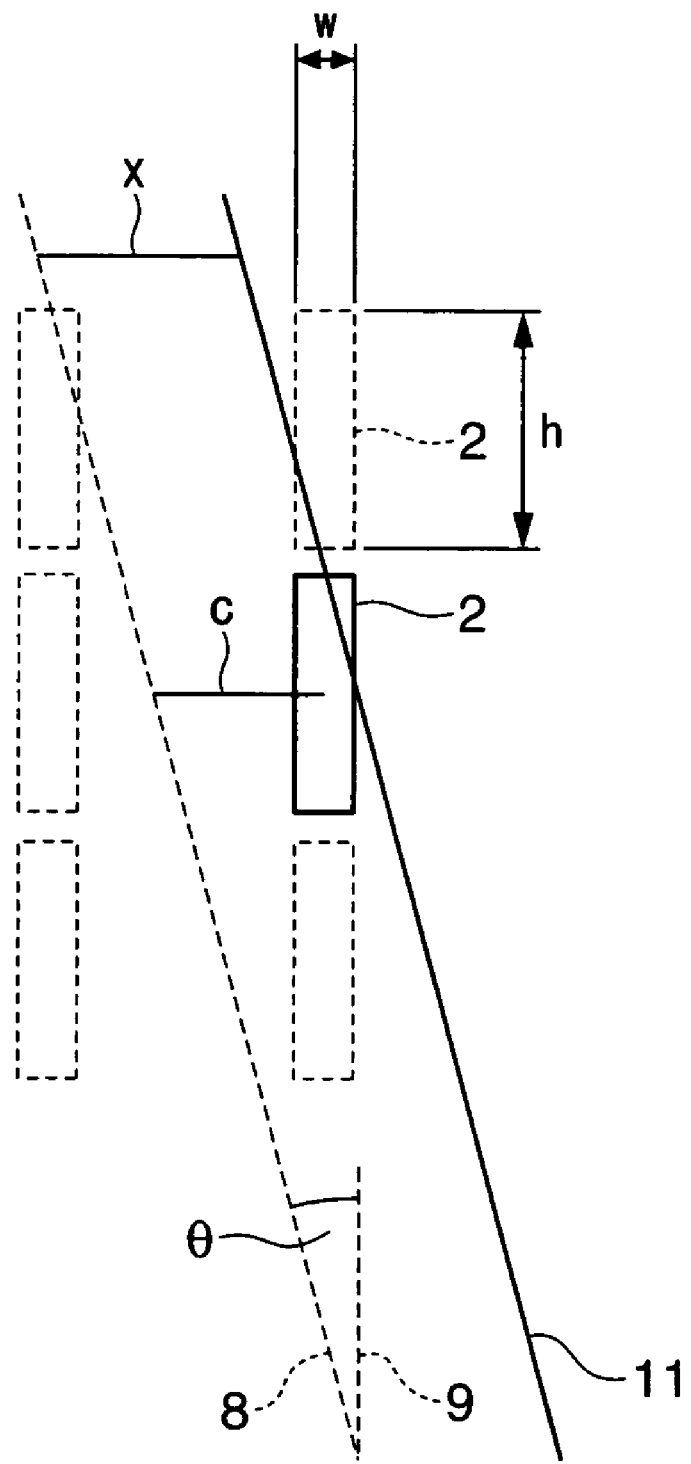
FIG. 5 shows a figure illustrating a relationship between color subpixels of the same color and a cylindrical lens according to the first aspect of the present invention.

FIG. 5 shows a figure illustrating the relationship between color subpixels of the same color and the cylindrical lens. As shown in FIG. 5, the horizontal distance between the center of one color subpixel 2 and the cylindrical lens central axis 8 is indicated by c. A straight line, which is parallel with the cylindrical lens central axis 8 and in which the horizontal distance is x, is considered. It should be noted that the number 11 shown in FIG. 5 is the straight line which is parallel with the cylindrical lens central axis.

Rays, which are emitted from points on the parallel line, travel at an angle of $\phi=\tan^{-1}(x/f)$ in the same horizontal direction after passing through the cylindrical lens. Therefore, the maximum intensity of the rays traveling in this horizontal direction is determined by the length in which this parallel line passes transversely across one color subpixel.

A case where the shape of each color subpixel is a rectangle is considered. The horizontal width of the rectangle is w and the vertical width of that is h. The relationship between the horizontal display direction φ and the maximum intensity I of the ray after passing through the cylindrical lens is obtained as follows:

when $h \tan \theta \leq w$ $$I(x) = \begin{cases} 0 & (x \leq c - (w + h\tan\theta)/2) \\ I_0\{x - c + (w + h\tan\theta)/2\}/h\tan\theta & (c - (w + h\tan\theta)/2 \leq x \leq c - (w - h\tan\theta)/2) \\ I_0 & (c - (w - h\tan\theta)/2 \leq x \leq c + (w - h\tan\theta)/2) \\ I_0\{-x + c + (w + h\tan\theta)/2\}/h\tan\theta & (c + (w - h\tan\theta)/2 \leq x \leq c + (w + h\tan\theta)/2) \\ 0 & (c + (w + h\tan\theta)/2 \leq x) \end{cases}$$

$$\phi = \tan^{-1}(x/f)$$

when $h\tan\theta \geq w$ $$I(x) = \begin{cases} 0 & (x \leq c - (h\tan\theta + w)/2) \\ I_0\{x - c + (w + h\tan\theta)/2\}/w & (c - (h\tan\theta + w)/2 \leq x \leq c - (h\tan\theta - w)/2) \\ I_0 & (c - (h\tan\theta - w)/2 \leq x \leq c + (h\tan\theta - w)/2) \\ I_0\{-x + c + (w + h\tan\theta)/2\}/w & (c + (h\tan\theta - w)/2 \leq x \leq c + (h\tan\theta - w)/2) \\ 0 & (c + (h\tan\theta + w)/2 \leq x) \end{cases}$$

$$\phi = \tan^{-1}(x/f)$$

wherein, when I is represented by a function in which the horizontal display direction φ is a variable, a complex formula containing an inverse trigonometric function is obtained, thus the distance x from the cylindrical lens central axis is used as a variable.

Figure 6A:
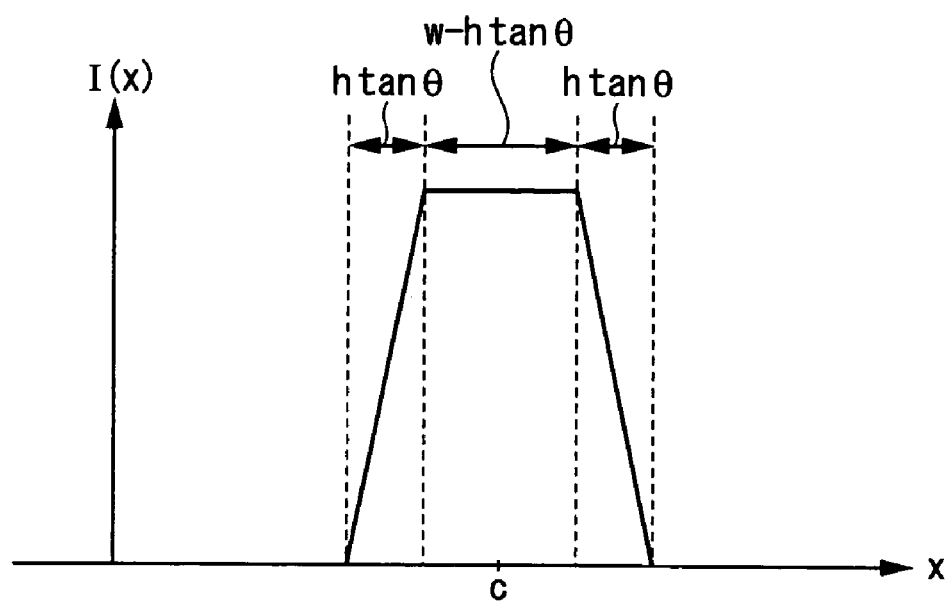
FIG. 6A shows a case where h tan θ≦w.
Figure 6B:
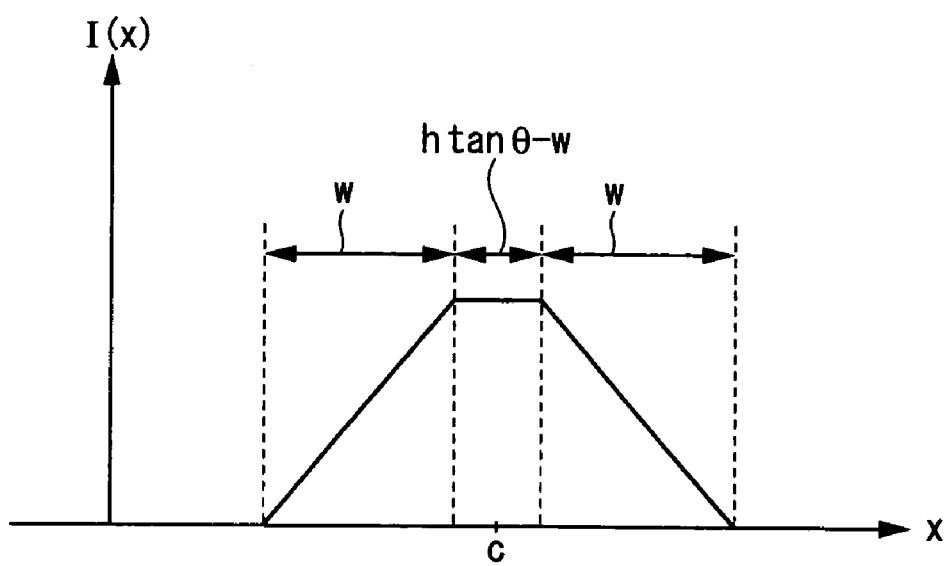
FIG. 6B shows a case where h tan θ≧w.

FIG. 6 shows a figure illustrating the above results. FIG. 6A shows the case where $h \tan \theta \leq w$, and FIG. 6B shows the case where $h \tan \theta \geq w$. The horizontal distances of a group of color subpixels in the same color with respect to the cylindrical lens central axis changes by a constant interval of $p_y \tan \theta$. Therefore, the intensity distribution shown in FIG. 6 can be shifted in the direction of the horizontal axis by $p_y \tan \theta$ and added to the adjacent intensity distribution so that the maximum light intensity of the three-dimensional pixel in the horizontal display direction can be obtained. Here, as a matter of course, preferably the maximum light intensity does not change according to the horizontal display direction.

Figure 7A:
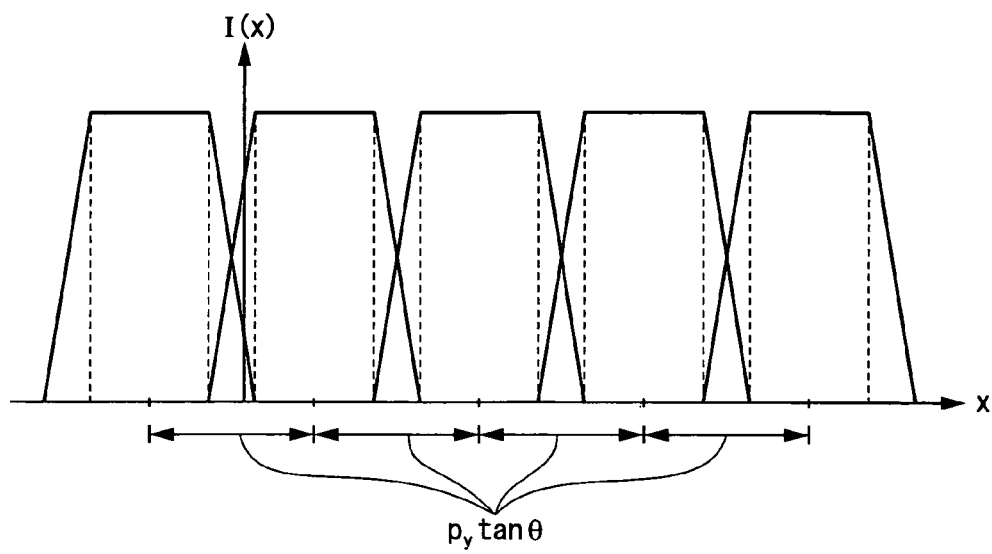
FIG. 7 shows a figure illustrating a condition in which the maximum light intensity of a single three-dimensional pixel in the horizontal display direction is constant in the present invention, wherein the condition that the maximum light intensity does not change is, as shown in FIG. 7A, satisfied when a hypotenuse of a trapezoid, which shows an intensity distribution produced by one color subpixel, completely overlaps with a hypotenuse of an adjacent trapezoid.
Figure 7B:
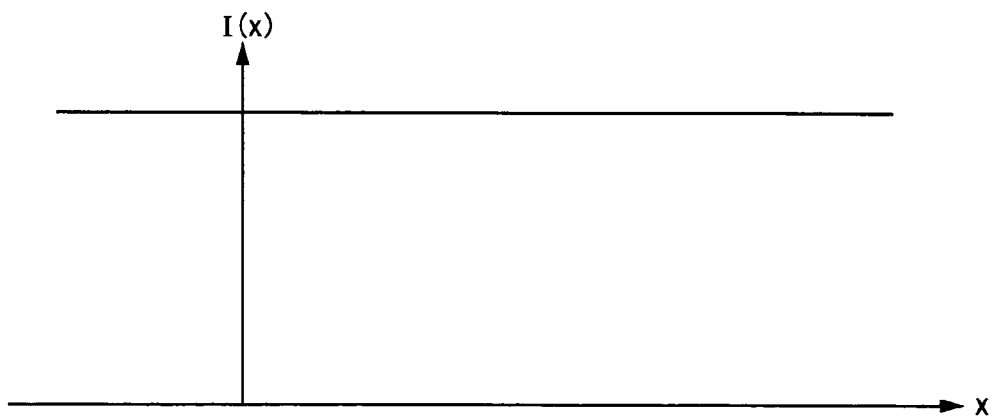

FIG. 7 shows a figure illustrating a condition in which the maximum light intensity emitted from the single three-dimensional pixel in the horizontal display direction is constant. The condition that the maximum light intensity does not change according to the horizontal display direction is, as shown in FIG. 7A, satisfied when a hypotenuse of a trapezoid, which shows an intensity distribution for one color subpixel, completely overlaps with a hypotenuse of an adjacent trapezoid, and the case showing an intensity distribution shown in FIG. 7B.

In the case where $h \tan \theta \leq w$, this condition is achieved when $w = p_y \tan \theta$, because the hypotenuses of the trapezoids completely overlap with each other when the distance between the trapezoids is w. In other words, it is understood that this condition is satisfied when the horizontal width w of the color subpixel is $w = 3p_x/N$ since $\tan\theta = 3p_x/Np_y$.

On the other hand, in the case where $h \tan \theta \geq w$, the condition is achieved when $h \tan \theta = p_y \tan \theta$, that is, when $h = p_y$, because the hypotenuses of the trapezoids completely overlap with each other when the distance between the trapezoids is $h \tan \theta$. Since a black matrix is present between upper and lower color subpixels so that $h < p_y$, the condition cannot be satisfied completely. Even if the black matrix is reduced so that the condition is almost satisfied, it is required that $p_x/w \geq N/3$ be satisfied due to the relationship of $h \tan \theta \geq w$ and $\tan \theta = 3p_x/Np_y$. When considering that $p_x/w \leq 1$, since the black matrix is provided between right and left color subpixels, it is necessary that N be 3 or less. Therefore, the number of color subpixels in the vertical direction, which are used to construct the three-dimensional pixel, is limited.

Next, a condition for making the variation of the maximum intensity 50% or less is calculated. Here, a case where $h \tan \theta \leq w$ is considered. FIG. 8 is a figure showing a condition in which the light intensity variation emitted from a single three-dimensional pixel in the horizontal display direction becomes 50%. FIG. 8A shows a case where the trapezoids overlap with each other excessively, wherein, according to the formula $w - h \tan \theta = p_y \tan \theta$, the horizontal width of the color subpixel satisfying this formula is obtained by $w = (1 + h/p_y)(3p_x/N)$. FIG. 8B shows the maximum light intensity of the three-dimensional pixel in the horizontal display direction in the abovementioned case. FIG. 8C shows a case in which the overlap between the trapezoids is not sufficient, wherein, according to the formula $(1/2)h \tan \theta + w = p_y \tan \theta$, w is obtained by $w = [1 - (1/2)(h/p_y)](3p_x/N)$. FIG. 8D shows the maximum light intensity distribution emitted from the three-dimensional pixel in the horizontal display direction in the abovementioned case. According to the above description, it is understood that the horizontal width of the color subpixel needs to satisfy the following formula:

$$\{1-(1/2)(h/p_y)\}(3p_x/N) \leq w \leq \{1+(h/p_y)\}(3p_x/N)$$

so that the variation in the light intensity in the horizontal display direction becomes 50% or less. The allowable range is $1-(1/2)(h/py)$-fold through $1+(h/p_y)$-fold with respect to the ideal width $3p_x/N$ of the color subpixel. In particular, the larger the $h/p_y$, i.e. the larger the vertical width h of the color subpixel, the larger the allowable range for the horizontal width w of the color subpixel.

As described above, when considering the accuracy in the fabrication of the pixels, even when $w = 3p_x/N$ in the pixel design process, it is clear that the vertical width of the pixel is preferably increased to be close to $p_y$.

With the same concept, a condition for making the variation of the maximum intensity 20% or lower is obtained as:

$$\{1-(1/5)(h/p_y)\}(3p_x/N) \leq w \leq \{1+(1/4)(h/p_y)\}(3p_x/N).$$

When the horizontal width of the color subpixel is set to w=3p$_x$/N, theoretically the variation in the maximum light intensity in the horizontal display direction does not occur. However, actually it is considered that the abovementioned formula cannot be completely satisfied due to manufacturing errors. Further, when w=3p$_x$/N is not established, naturally, the change in the maximum light intensity occurs in the horizontal display direction. When directions in which the light intensity becomes maximum or minimum are not identical for all RGB colors, color non-uniformity occurs in the horizontal display direction, deteriorating color reproductivity for a three-dimensional image. For example, when a white color is displayed, the color changed to R, G, B colors in the horizontal display direction. Between color subpixels of different colors, the horizontal distances with respect to the cylindrical lens central axis differs by p$_x$ or 2p$_x$. On the other hand, between color subpixels of the same color, the horizontal distance between the color subpixels and the cylindrical lens central axis changes at a constant interval of p$_y$ tan θ=(3/N)p$_x$. When the positions of the color subpixels of the same color change by N/3 pixels in the vertical direction, the horizontal distance changes by p$_x$, and when the positions of the color subpixels of the same color change by 2N/3 pixels in the vertical direction, the horizontal distance changes by 2p$_x$. Therefore, by setting N as the multiples of 3, the horizontal distances of the color subpixels can be completely matched for R, G, B colors. Accordingly, the variations in the light intensity in the horizontal display direction can be made identical for the three primary colors of RGB, and the color variation in the horizontal display direction can be eliminated.

Figure 9:
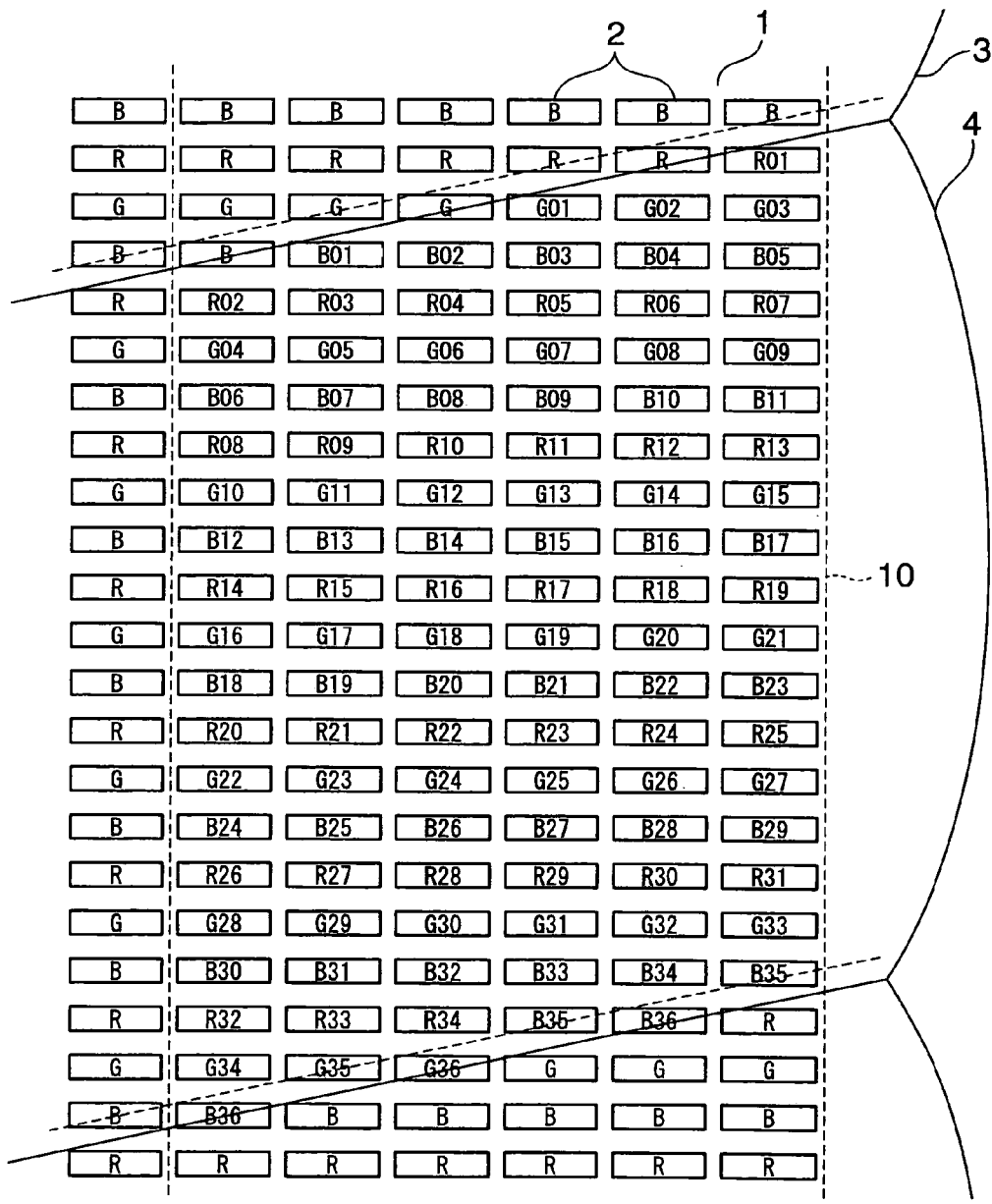
FIG. 9 shows a figure which schematically illustrates a construction of the three-dimensional pixel in a case where N=6 in an embodiment in the first aspect of the present invention.

Considering that the black matrix is provided between color subpixels, it is difficult to properly satisfy N=3, w=p$_x$. FIG. 9 shows a case in which N=6. In FIG. 9, the inclination of the lenticular sheet is θ=tan$^{-1}$(p$_x$/2p$_y$). Further, the design is such that w=p$_x$/2 so that a fluctuation of the maximum intensity in the horizontal display direction is eliminated. Moreover, by setting N as the multiples of 3, color variation, which is caused due to the fabrication error when w=p$_x$/2 is not properly satisfied, is prevented. In FIG. 9, M=6 and one three-dimensional pixel is constructed by 108 color subpixels to realize 36 horizontal display directions.

Figure 10:
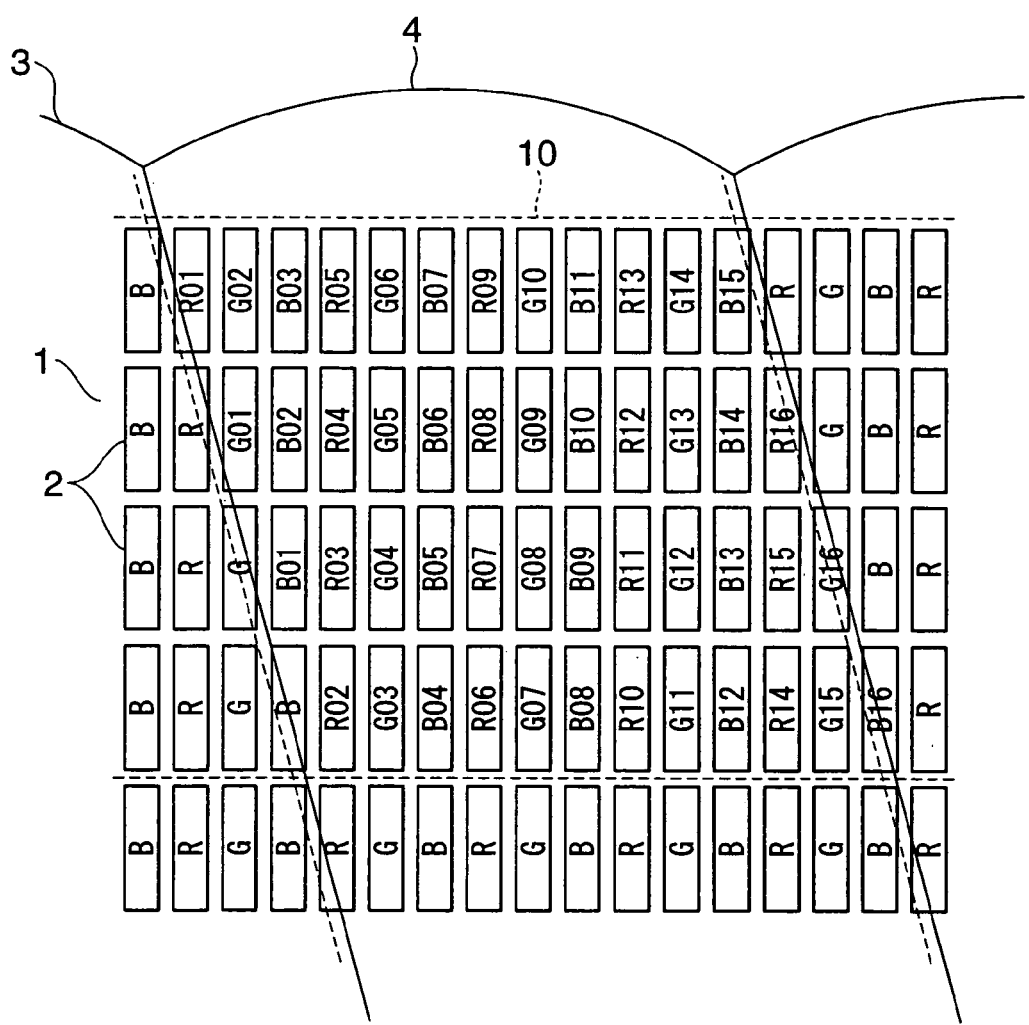
FIG. 10 shows a figure which schematically illustrates a construction of the three-dimensional pixel in a case where N=4 in other embodiment in the first aspect of the present invention.

FIG. 10 shows a design example when N=4. In this case, the inclination angle θ of the lenticular sheet is θ=tan$^{-1}$(3p$_x$/4p$_y$). Further, the design is such that w=3p$_x$/4 so that a fluctuation of the maximum intensity in the horizontal display direction is eliminated. In FIG. 10, M=4 and one three-dimensional pixel is composed of 48 color subpixels to realize 16 horizontal display directions.

The above has described a case where the shape of each color subpixel is a rectangle. However, the actual shape of the color subpixel may be designed such that a part of the rectangle is missing, or modified so as to obtain a multidomain structure. Here, a case where the color subpixel is in any shape is described herein after in detail.

Figure 11A:
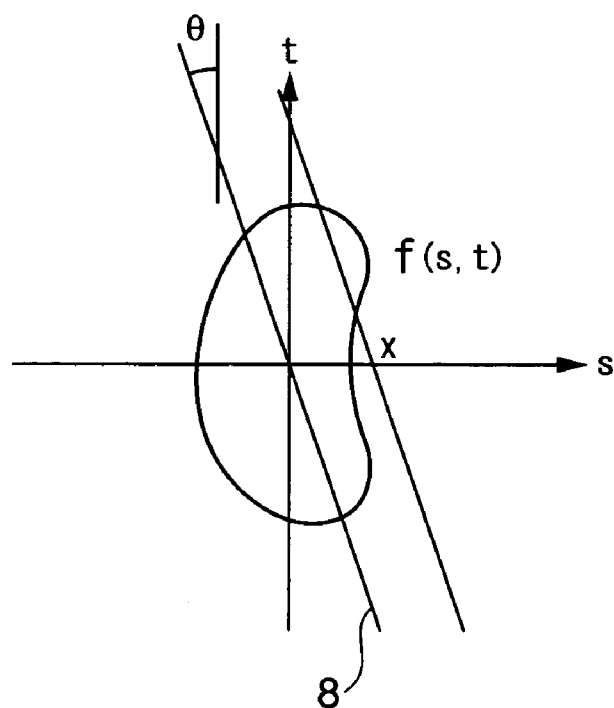
FIG. 11A shows a figure illustrating a light intensity distribution emitted from a pixel having an arbitrary shape.
Figure 11B:
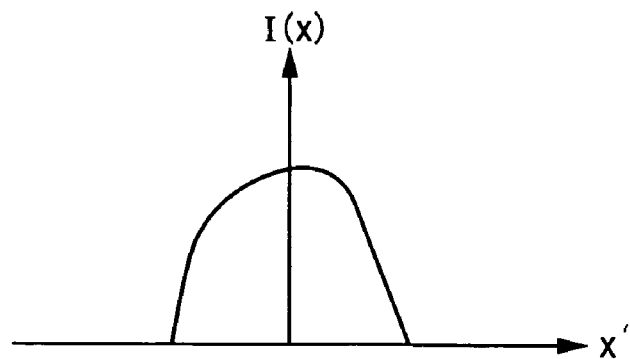
FIG. 11B shows a figure illustrating the maximum light intensity distribution emitted from the pixel in the horizontal display direction.

FIG. 11A shows a figure showing a light intensity distribution emitted from a pixel having any shape, and FIG. 11B is a figure showing the maximum light intensity distribution in the horizontal display direction according to one pixel. The distribution of the maximum intensity distribution of ray emitted from a color subpixel is represented by a function f(s, t). In FIG. 11A, a straight line, which is parallel with the cylindrical lens central axis is considered on a light-emission surface of the two-dimensional display. The rays which are emitted on this parallel straight line travel in the same horizontal direction after passing through the cylindrical lens. Therefore, the sum of the intensities of the rays emitted from the points on the parallel line in the pixel gives the maximum light intensity in the corresponding horizontal display direction φ. Since the straight line, which is parallel with the cylindrical lens central axis 8 and in which the horizontal distance is x, is represented by s=−t tan θx, the sum of the intensities of the pixels along this straight line is given by:

$$I(x) = \int_{-\infty}^{\infty} f(-t\tan\theta + x, t)dt$$

$$\phi = \tan^{-1}(x/f)$$

FIG. 11B illustrates there relationships. The horizontal distances between color subpixels of the same color and the cylindrical lens central axis 8 change at a constant interval of p$_y$ tan θ. Therefore, the light intensity distribution in the horizontal display direction produced by the entire three-dimensional pixel is given by:

$$I_s(x) = \sum_i I(x + ip_y \tan\theta)$$

Figure 12:
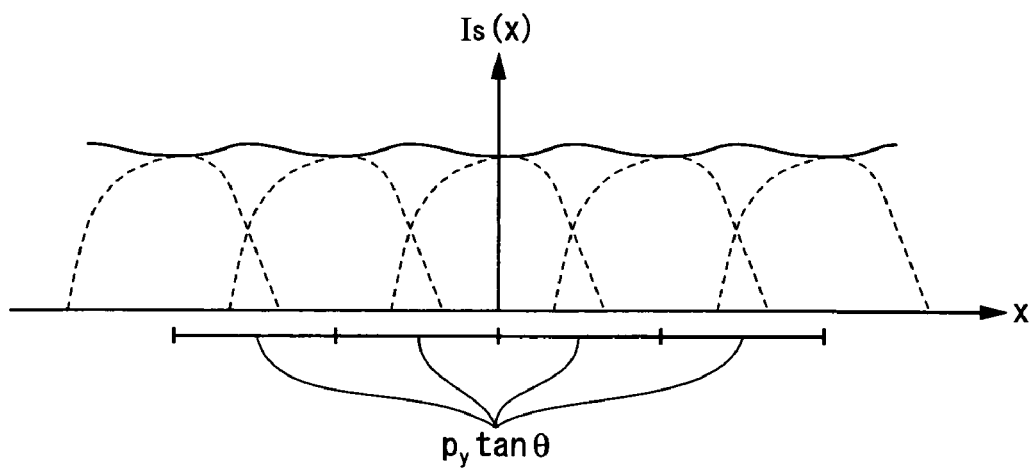
FIG. 12 shows a figure illustrating a light intensity distribution emitted from a three-dimensional pixel in the horizontal display direction, the three-dimensional pixel using pixels having an arbitrary shape in the present invention.

FIG. 12 shows a figure illustrating a light intensity distribution in the horizontal display direction produced by a three-dimensional pixel using any shape of pixel. In FIG. 12, the light intensity distribution in the horizontal directions shown by a solid line produced by a three-dimensional pixel is obtained by adding up the light intensity distributions produced by color subpixels shown with dashed lines. As shown in FIG. 12, it is desired that the pixel structure and the inclination θ of the lenticular sheet are determined so that the added up light intensity Is(x) shown by a solid line becomes approximately constant.

(Second Aspect of the Present Invention)

The above has described the case in which the three colors of color subpixels corresponding to the three primary colors of RGB are disposed in the stripe arrangement. As the arrangement of the color subpixels, a diagonal arrangement can also be considered in which the color subpixels of the same color are shifted in a diagonal direction. The second aspect of the present invention is explained using such arrangement.

Figure 13:
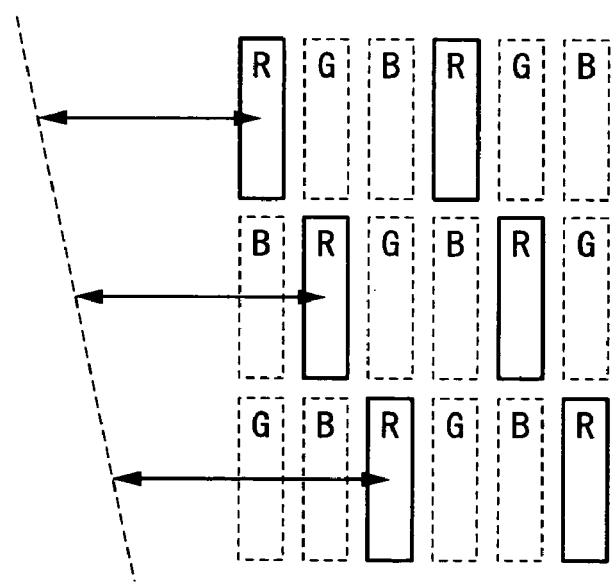
FIG. 13 shows a figure illustrating a diagonal pixel arrangement and a horizontal distance between a central axis of the cylindrical lens and the center of each color subpixel in a second aspect of the present invention.

FIG. 13 shows a figure illustrating a diagonal color subpixel arrangement and a horizontal distance between a cylindrical lens central axis and the center of each color subpixel according to the second aspect of the present invention. When considering the color subpixels of the same color, the horizontal distance between the color subpixels, whose vertical positions are different by one pixel, changes by P$_x$−p$_y$ tan θ. When N(p$_x$−p$_y$ tan θ), which is a change in the horizontal distance corresponding to the N subpixels in the vertical direction, becomes equal to 3p$_x$, which is a change in the horizontal distance between the color subpixels of the same color on the same horizontal line, the horizontal distances of color subpixels of the same color within one three-dimensional pixel change at a constant interval. Therefore, when N(p$_x$−p$_y$ tan θ)=3p$_x$, the inclination of the lenticular sheet θ is calculated as θ=tan$^{-1}$[(1−3/N)p$_x$/p$_y$].

As described above, the horizontal distance between the color subpixels of the same color changes by the constant interval of p$_x$ tan θ in the case of the stripe arrangement, while it changes by the constant interval of p$_x$−p$_y$ tan θ in the case of the diagonal pixel arrangement. The inclination of the lenticular sheet is θ=tan$^{-1}$(3p$_x$/Np$_y$) in the case of the stripe arrangement, while it is θ=tan$^{-1}$[(1−3/N)p$_x$/p$_y$] in the diagonal pixel arrangement.

By providing changes with respect to the above two points, results obtained in the case of the stripe arrangement can be applied to the diagonal pixel arrangement.

In this case, a condition for making the maximum intensity of the three-dimensional pixel in the horizontal display direction a constant value is obtained as follows. When the color subpixel is a rectangle, the light intensity distribution corresponding to one color subpixel in the horizontal display direction can be expressed in the same way as with the case of the stripe arrangement, and has the distribution shown in FIG. 6. However, the horizontal distances of color subpixels of the same color with respect to the cylindrical lens central axis changes by a constant interval of $p_x - p_y \tan\theta$, thus $p_y \tan\theta$ in FIG. 7 needs to be replaced with $p_x - p_y \tan\theta$, and it is understood that, when $h \tan\theta \leq w$, the requirement can be achieved when $w = p_x - p_y \tan\theta$. Therefore, w should be equal to $3p_x/N$. Furthermore, when $h \tan\theta \geq w$, the requirement can be achieved when $h \tan\theta = p_x - p_y \tan\theta$. Therefore, h should be equal to $3p_y/(N-3)$.

Moreover, in order to make the change in the light intensity in the horizontal direction 50% or less, the horizontal width of a color subpixel needs to satisfy the following formula:

$$\{1-(1/2)(N/3-1)(h/p_y)\}(3p_x/N) \leq w \leq \{1+(N/3-1)(h/p_y)\}(3p_x/N).$$

Then, a condition for making the change in the maximum intensity 20% or less, $$\{1-(1/5)(N/3-1)(h/p_y)\}(3p_x/N) \leq w \leq \{1+(1/4)(N/3-1)(h/p_y)\}(3p_x/N)$$

is obtained.

Moreover, it is preferred that the number of color subpixels N in the vertical direction, which construct the single three-dimensional pixel, should be the multiples of 3 for the same reason as for the case of the stripe arrangement. Similarly, it is preferred that $Np_y \leq 3Mp_x$.

Figure 14:
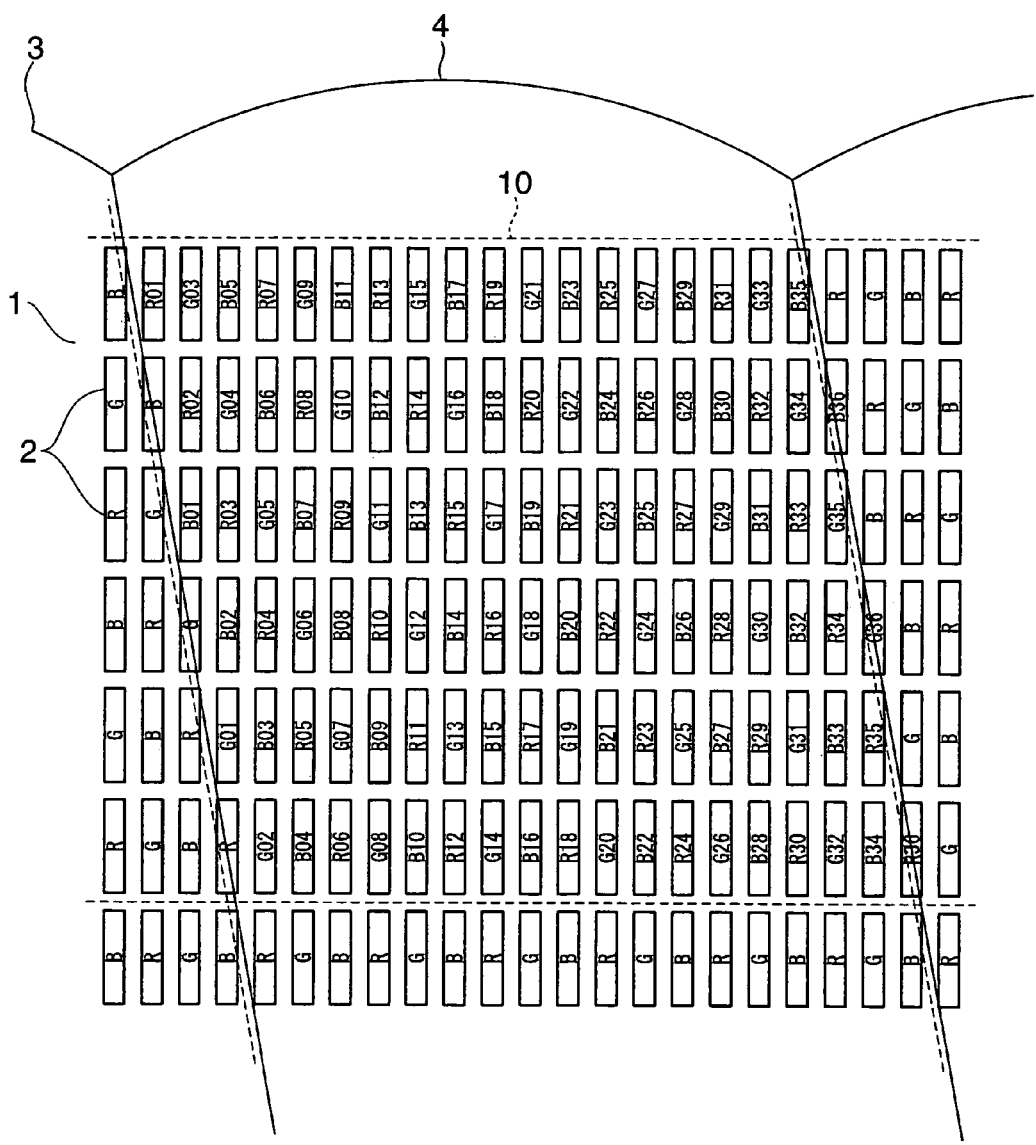
FIG. 14 shows a figure illustrating a construction of the three-dimensional pixel in the case where N=6 in an embodiment in the second aspect of the present invention.

FIG. 14 shows an example of a preferred embodiment of the present invention for the case of the diagonal pixel arrangement. In an embodiment in the second aspect of the present invention shown in FIG. 14, N=6 and $w=p_x/2$. In the embodiment shown in FIG. 14, the inclination angle of the lenticular sheet is $\theta = \tan^{-1}(p_x/2p_y)$. Further, the design is such that $w=p_x/2$ so that a fluctuation of the maximum intensity in the horizontal display direction is eliminated. Moreover, by setting N as the multiples of 3, color non-uniformity, which occurs when $w=p_x/2$ is not exactly satisfied due to the production error, is prevented. In FIG. 14, M=6 and one three-dimensional pixel is composed of 108 color subpixels to realize 36 horizontal display directions.

Figure 15:
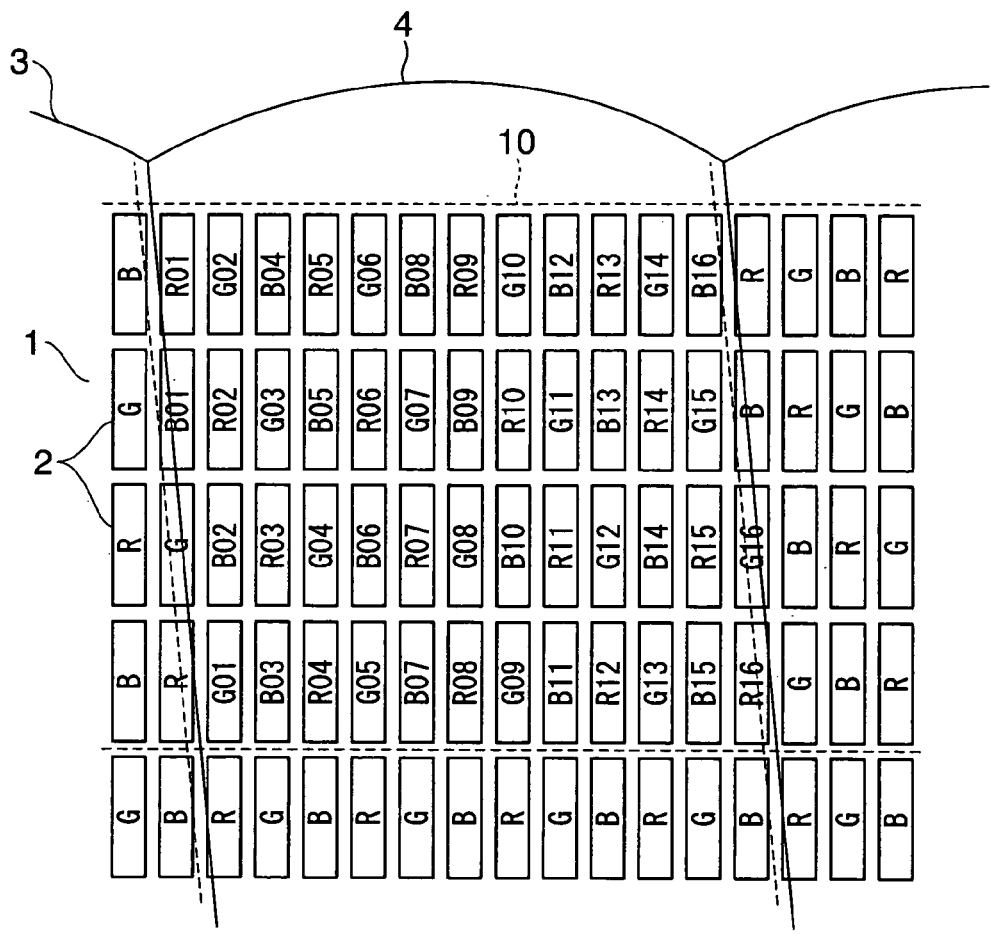
FIG. 15 shows a figure illustrating a construction of the three-dimensional pixel in a case where N=4 in other embodiment in the second aspect of the present invention.

FIG. 15 shows a design example when N=4. In this case, the inclination angle $\theta$ of the lenticular sheet is $\theta = \tan^{-1}(p_x/4p_y)$. Further, the design is such that $w=3p_x/4$ so that a fluctuation of the maximum intensity in the horizontal display direction is eliminated. In FIG. 15, M=4 and one three-dimensional pixel is composed of 48 color subpixels to realize 16 horizontal display directions.

In the second aspect of the present invention, instead of a rectangle, any other shapes of the color subpixel can be considered in the same manner as with the case of the stripe arrangement. In the case of any shape, the horizontal distance between color subpixels of the same color changes at a constant interval of $p_x - p_y \tan\theta$, thus the light intensity distribution produced by the entire three-dimensional pixel in the horizontal display direction is represented by:

$$I_s(x) = \sum_i I(x + i(p_x - p_y \tan\theta))$$

Therefore, preferably the pixel structure and the inclination angle of the lenticular sheet are determined so that Is(x) is made substantially constant.

The above has described the method of inclining the lenticular sheet, but those skilled in the art could easily understand that the same effects can be obtained by inclining a two-dimensional display instead of inclining the lenticular sheet.

The first and second aspects of the present invention have described that the constructing method according to the present invention uses a lenticular sheet. However, those skilled in the art could easily understand that the configuring method can be realized even when using a parallax barrier in place of the lenticular sheet. Here, in the parallax barrier, slits are arranged in a direction perpendicular to a longitudinal direction of the slits. In this case, the parallax barrier can be set not only on an observer side of the two-dimensional display but on a side opposite to the observer, i.e. between the display screen and a back light.

Moreover, the above has described the construction in which the cylindrical lens is disposed directly above the color subpixel group which comprises the three-dimensional pixel. Specifically, the above has described the construction in which the horizontal pitch of the three-dimensional pixel is equal to the horizontal pitch of the cylindrical lens comprising a lenticular sheet. However, the present invention can be applied even when these two pitches are not equal to each other. This method is used widely to increase the viewing zone of the three-dimensional image in the horizontal direction at a specific observation distance from the three-dimensional screen.

(Third Aspect of the Present Invention)

The three-dimensional display according to a third aspect of the present invention is same as that of the first aspect of the present invention in terms of its basic construction. Therefore, relationships of the horizontal pitch of the color subpixels of the two-dimensional display, the vertical pitch of those, the inclination angle θ of the cylindrical lens central axis, and the numbers of color subpixels in row and column directions used as a group corresponding to the cylindrical lens are same as those in the first aspect of the present invention.

Figure 16:
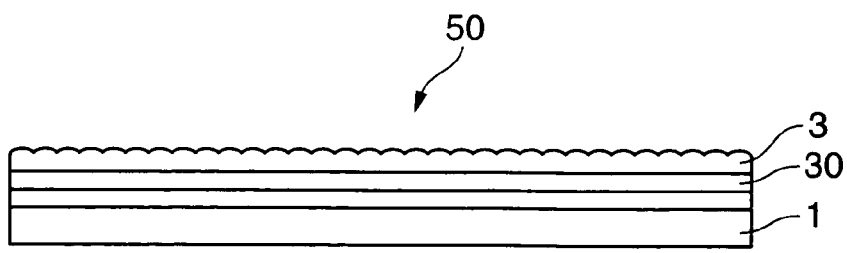
FIG. 16 shows a schematic cross-sectional diagram of the three-dimensional display in third and fourth aspects of the present invention.

However, the three-dimensional display 50 according to the third aspect of the present invention comprises, as shown in FIG. 16, an aperture array 30 between the two-dimensional display 1 and the lenticular sheet 3. Although the aperture array which is used in the present invention is not limited to the following examples, a metal film such as a chrome mask can be used as the aperture array. Alternatively, a black stripe, which is created with a light-absorbing material and is usually used to prevent light from illuminating wiring section disposed between color subpixels on the liquid crystal display panel, can be used to fabricate the aperture array. It should be noted that, in the black stripe used in the two-dimensional display, color filters for RGB are formed in an aperture. However, the aperture array used in the present invention does not require color filters. Moreover, preferably a glass substrate or a plastic plate made of acrylic material or the like is disposed between the aperture array 30 and the two-dimensional display shown in FIG. 16, in order to make the two-dimensional display 1 and the aperture array 30 parallel with each other and maintain the distance between the two-dimensional display 1 and the aperture array 30 constant.

Figure 17:
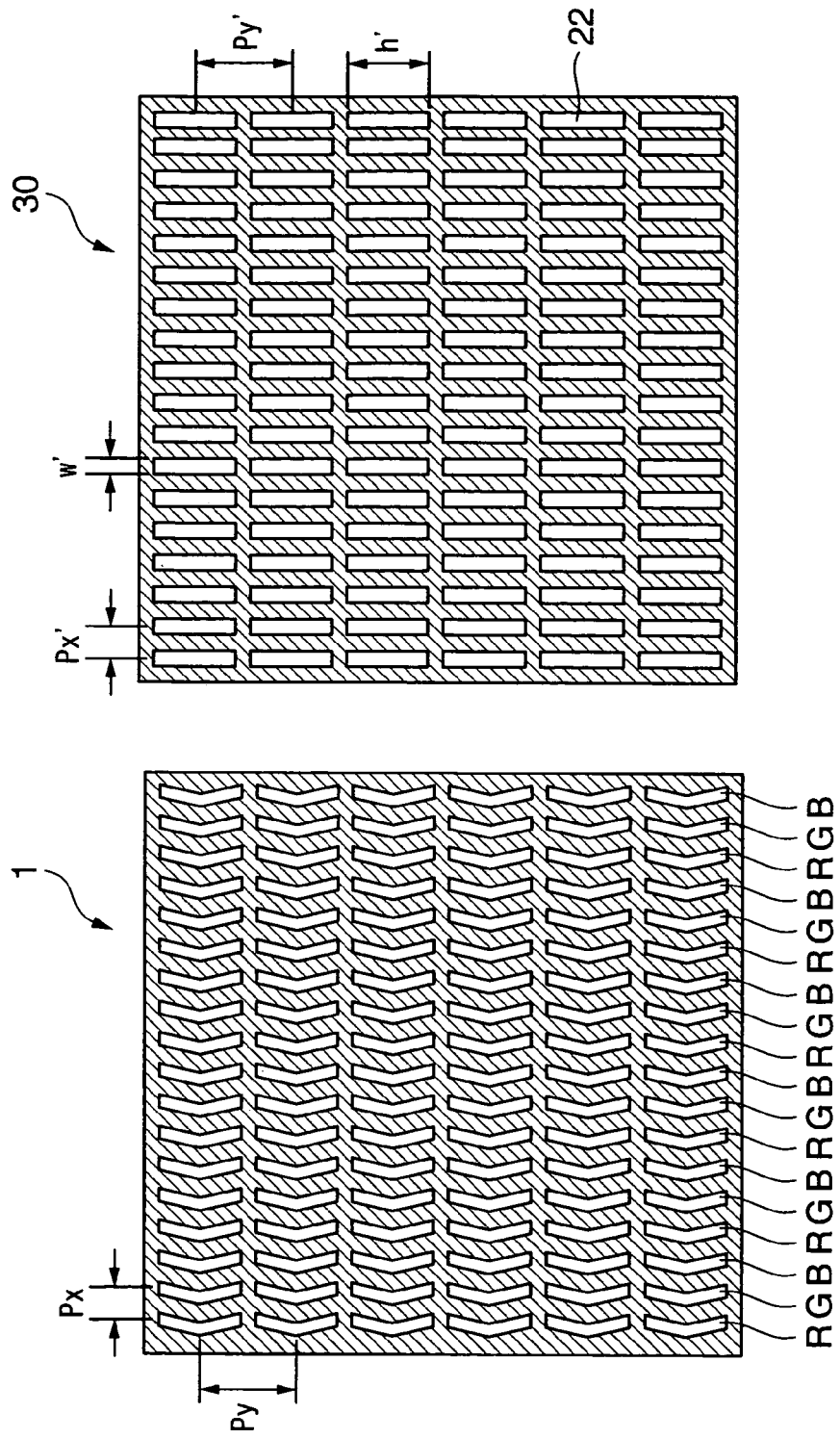
FIG. 17 shows a figure for explaining the relationship between a two-dimensional display and an aperture array in the third and fourth aspects of the present invention. Note that a hatching section shows a black matrix.

FIG. 17 shows a figure for explaining the relationship between the two-dimensional display 1 and the aperture array 30 which are used in the third aspect of the present invention. It should be noted in FIG. 17 that each color subpixel in the two-dimensional display 1 has a zigzag shape, but the present invention is not limited to this shape. The pitches of the horizontal color subpixels and vertical color subpixels in the two-dimensional display 1 shown in FIG. 17 are $P_x$ and $p_y$, respectively. On the other hand, the horizontal pitch and the vertical pitch of each aperture 22 of the aperture array 30 used in the third aspect of the present invention are $p_x'$ and $p_y'$ respectively, and the horizontal width and vertical width of the aperture are w' and h' respectively.

When the following relationships are provided for $p_x$, $p_y$, $p_x'$ and $p_y'$, light which is emitted from the color subpixels and passes through aperture array can generate a virtual color subpixel, which has a most suitable shape to construct the three-dimensional display:

$$p_x = p_x', p_y = p_y', \text{ and } \theta = \tan^{-1}(3p_x'/Np_y').$$

It should be noted that the relationship, $\theta = \tan^{-1}(3p_x'/Np_y')$ is obtained as in the first aspect of the present invention.

In this manner, by using the aperture array comprising apertures having the above relationship, RGB light beam emitted from the two-dimensional display can be modified to have optimal shape, whereby a change in the light intensity and a change in light color in the horizontal display direction can be eliminated.

Figure 18:
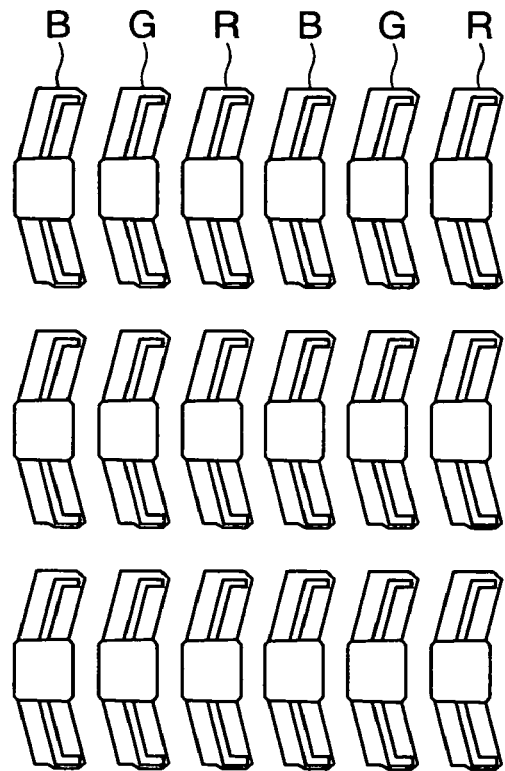
FIG. 18 shows a schematic cross-sectional diagram illustrating an example of a color subpixel structure in the two-dimensional display used in the present invention. Note that RGB in FIG. 18 represent colors of color subpixels and colors are identical in a vertical direction.

FIG. 18 shows a schematic diagram illustrating a color subpixel structure in the two-dimensional display used in the third aspect and a fourth aspect of the present invention. Here, the color subpixel structure illustrated in FIG. 18 is divided into top, bottom, right and left sections to have a so-called multidomain structure, and RGB color subpixels of the same color are aligned in the vertical direction. The third and fourth aspects of the present invention can be even applied to this color subpixel structure.

Figure 19:
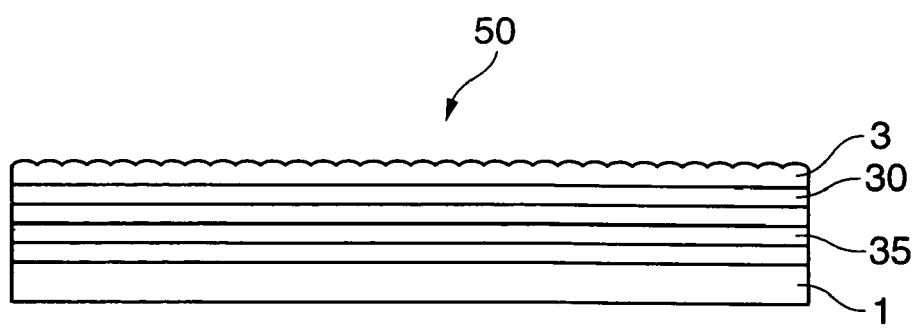
FIG. 19 shows a schematic cross-sectional diagram of the three-dimensional display in which a diffuser is disposed, according to the third and fourth aspects of the present invention.

FIG. 19 shows a modification of the third aspect of the present invention and shows a schematic cross-sectional diagram of the three-dimensional display 50 in which a diffuser 35 is disposed between the aperture array 30 and the two-dimensional display. It should be noted that preferably glass substrates or plastic plates made of acrylic material or the like is disposed between the aperture array 30 and the diffuser 35 and between the two-dimensional display 1 and the diffuser 35, in order to make the two-dimensional display 1, the diffuser 35, and the aperture array parallel one another, and to maintain the distances among these members 1, 35 and 30 constant. In the construction illustrated in FIG. 19, in the case where the degree of diffusion of light beam emitted from the color subpixels of the two-dimensional display 1 is low, if a sufficient light intensity distribution is not obtained at the apertures of the aperture array 30, the diffuser can be disposed between color subpixel of the two-dimensional display and the aperture array so that the degree of diffusion of the light beam can be adjusted.

(Fourth aspect of the present invention)

The three-dimensional display according to the fourth aspect of the present invention is same as that of the second aspect of the present invention in terms of its basic construction. Therefore, relationships of the horizontal pitch of the color subpixels of the two-dimensional display, the vertical pitch of those, the inclination angle θ of the cylindrical lens central axis, and the numbers of color subpixels in row and column directions used as a group corresponding to the cylindrical lens are same as those in the second aspect of the present invention.

However, the three-dimensional display 50 according to the fourth aspect of the present invention comprises, as shown in FIG. 16, the aperture array 30 between the two-dimensional display 1 and the lenticular sheet 3. Here, the aperture array which is used in the present invention is same as the one described in the third aspect of the present invention, thus the explanation thereof is omitted.

FIG. 17 shows a figure for explaining the relationship between the two-dimensional display 1 and the aperture array 30 which are used in the fourth aspect of the present invention. It should be noted in FIG. 17 that each color subpixel in the two-dimensional display 1 has a zigzag shape, but the present invention is not limited to this shape. The horizontal and vertical pitches of color subpixels in the two-dimensional display 1 shown in FIG. 17 are $p_x$ and $p_y$ respectively. On the other hand, the horizontal pitch and the vertical pitch of each aperture 22 of the aperture array 20 used in the fourth aspect of the present invention are $p_x'$ and $p_y'$ respectively, and the horizontal width and vertical width of the aperture are w' and h' respectively.

When the following relationships are provided for $p_x$, $p_y$, $p_x'$ and $p_y'$, light which is emitted from the color subpixels and passes through the aperture array can generate a virtual color subpixel, which has a most suitable shape to construct the three-dimensional display:

$$p_x = p_x', p_y = p_y', \text{ and } \theta = \tan^{-1}[(1-3/N)p_x'/p_y'].$$

It should be noted that the relationship, $\theta = \tan^{-1}[(1-3/N)p_x'/p_y']$ is obtained as in the second aspect of the present invention.

In this manner, by using the aperture array comprising apertures having the above relationship, RGB light beam emitted from the two-dimensional display can be modified to have an optimal shape, whereby a change in the light intensity and a change in light color in the horizontal direction can be eliminated.

FIG. 19 shows a modification of the fourth aspect of the present invention and is a schematic cross-sectional diagram of the three-dimensional display 50 in which the diffuser 35 is disposed between the aperture array 30 and the two-dimensional display. In the construction illustrated in FIG. 19, in the case where the degree of diffusion of a light beam emitted from the color subpixels of the two-dimensional display 1 is low, if a sufficient light intensity distribution is not obtained at the apertures of the aperture array 30, the diffuser can be disposed between color subpixels of the two-dimensional display and the aperture array so that the degree of diffusion of the light beam can be adjusted.

EXAMPLES

The above has described the present invention in further detail with the embodiments of the present invention. However, these embodiments are merely exemplary, thus the present invention is not to be limited to the following specific examples. Those skilled in the art can implement the present invention by adding various changes to the following embodiments, and such changes are included in the scope of claims of the present specification.

A liquid display panel (T221, manufactured by IBM Corporation) having a resolution of 3840×2400 is used as the two-dimensional display. Color subpixels are arranged in the stripe arrangement in which RGB subpixels are disposed periodically in the horizontal direction, and the number of color subpixels is 11520 x 2400. The pitches of the color subpixels are $p_x$=0.0415 mm and $p_y$=0.1245 mm.

Figure 20:
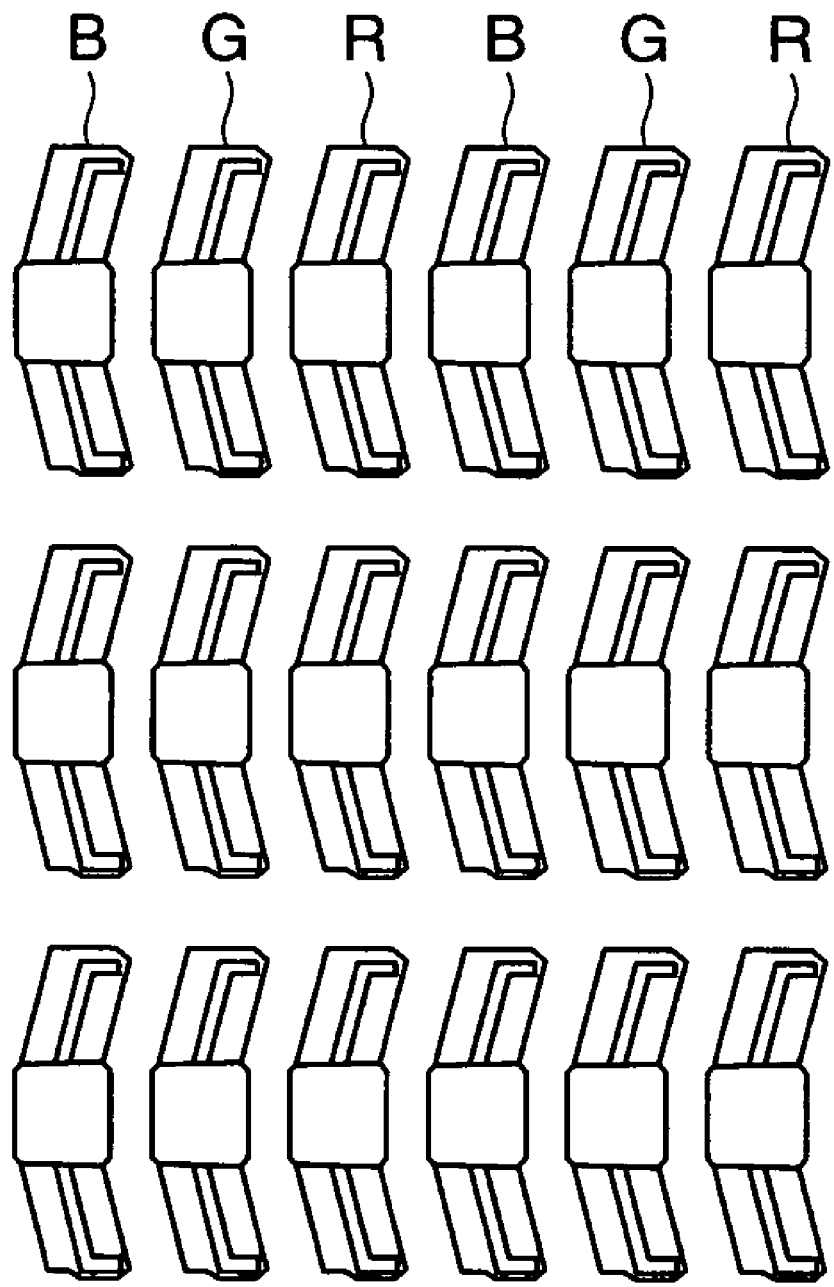
FIG. 20 shows a schematic drawing illustrating the color subpixel structure used in the embodiments of the present invention. Note that RGB in FIG. 20 represent colors of subpixels and colors are identical in the vertical direction.

FIG. 20 shows a schematic drawing illustrating a subpixel structure of the liquid crystal display panel used in the embodiments of the present invention. This figure shows 6 color subpixels in the horizontal direction and 3 color subpixels in the vertical direction. The color subixels have a multidomain structure which is divided into top, bottom, right and left sections.

As shown in FIG. 20, since the shape of the color subpixel is not a rectangle, the number of vertical subpixels used in the three-dimensional pixel is determined as N=6 using the formula (I). It is clear that this number is appropriate because the horizontal width w of each color subpixel is approximately half of the horizontal pitch $p_x$ as shown in FIG. 20.

Figure 21A:
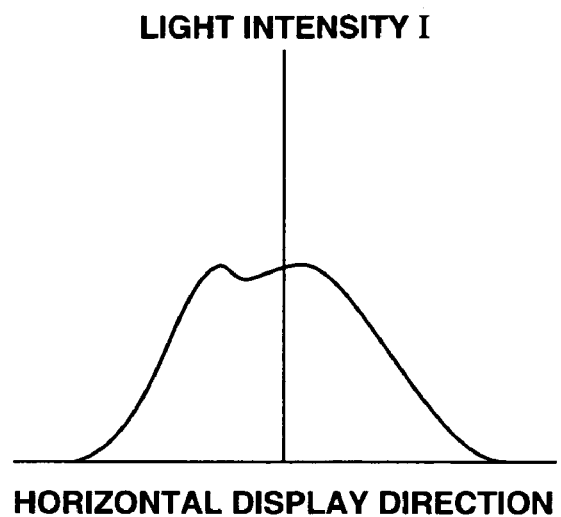
FIG. 21A shows a figure illustrating a light intensity distribution emitted from a single color subpixel in the horizontal display direction in the embodiments according to the present invention.
Figure 21B:
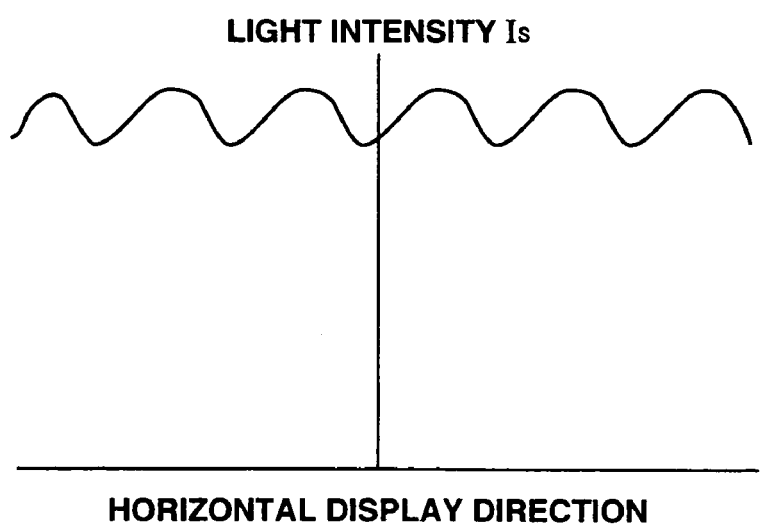
FIG. 21B shows a figure illustrating a part of a light intensity distribution emitted from a single three-dimensional pixel in the horizontal display direction in the embodiments according to the present invention.

FIG. 21A shows a figure illustrating an intensity distribution in the horizontal display direction emitted from a single color subpixel in the embodiments according to the present invention, and FIG. 21B shows a figure illustrating a part of an intensity distribution in the horizontal direction emitted from a single three-dimensional pixel in the embodiments according to the present invention. Although there is slight intensity non-uniformity due to the subpixel structure, substantially constant intensity distribution is obtained.

Figures 22, 23:
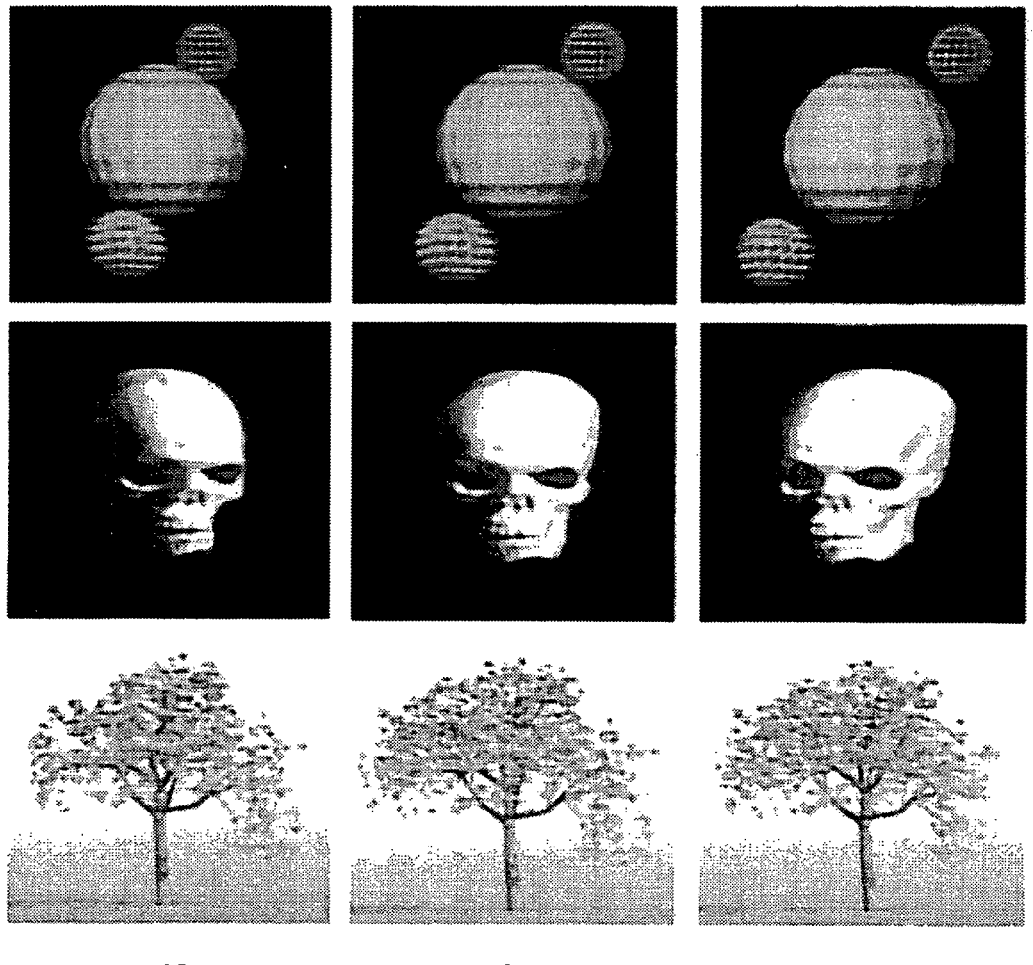
FIG. 22 shows a figure illustrating the specifications of the three-dimensional display in which N=6.
FIG. 23 shows a figure illustrating pictures of three-dimensional images obtained using the three-dimensional display which is fabricated experimentally on the basis of the specifications of Type I according to the present invention.

FIG. 22 shows a figure illustrating the specifications of the three-dimensional display in which N=6. In FIG. 22, Type I was designed to increase the number of horizontal display directions, while Type II was designed to increase the number of three-dimensional pixels.

Next, the three-dimensional display having the specifications of Type I is experimentally constructed according to the present invention. M is equal to 12. Specifically, the total of 216 color subpixels are used in which 36 color subpixels are arranged in the horizontal direction and 6 color subpixels are arranged in the vertical direction, to construct a single three-dimensional pixel. The number of the horizontal display directions is 72. FIG. 23 shows a picture of three-dimensional images displayed by the three-dimensional display. The picture shown in FIG. 23 was captured from several horizontal directions. As shown in FIG. 23, it was discovered that a motion parallax was provided in the three-dimensional image produced by the present invention, and the non-uniformity in the intensity distribution can hardly be observed in the images.

INDUSTRIAL APPLICABILITY

According to the present invention, a three-dimensional display, which can display a large number of different images in different horizontal display directions and which can eliminate color non-uniformity and intensity non-uniformity, is provided.

I claim:

1. A three-dimensional display comprising:
   a two-dimensional display, which comprises a plurality of color subpixels arranged in rows extending in a horizontal direction and in columns extending in a vertical direction which is substantially perpendicular to the horizontal direction, the color subpixels of red, green and blue being arranged periodically in the rows, and the color subpixels of the same color being arranged in the columns; and
   a lenticular sheet provided on the two-dimensional display and having a plurality of cylindrical lenses through which the color subpixels are viewed and which are arranged in parallel with one another, the central axis of each cylindrical lens being inclined at an angle of θ to the column of the two-dimensional display,
   wherein, when a pitch of the color subpixels in the horizontal direction is $p_x$, a pitch of the color subpixels in the vertical direction is $p_y$, and a color subpixel group constituting one three-dimensional pixel includes 3M×N number of color subpixels where 3M is the number of color subpixels in each row corresponding to one of the cylindrical lenses and N is the number of color subpixels in each column corresponding to one of the cylindrical lenses, a relationship, $\theta=\tan^{-1}(3p_x/Np_y)$, is satisfied.

2. The three-dimensional display according to claim 1, wherein the two-dimensional display that has color subpixels is selected from the group consisting of a liquid crystal display, an organic EL display, and a plasma display.

3. The three-dimensional display according to claim 1 or 2, wherein the N is the multiples of 3.

4. The three-dimensional display according to any one of claims 1 to 3, wherein, in a construction of the three-dimensional pixel, $Np_y \leq 3Mp_x$ is satisfied.

5. The three-dimensional display according to any one of claims 1 to 4, wherein when a horizontal width and a vertical width of the color subpixels are w and h respectively, $w=3p_x/N$ is satisfied.

6. The three-dimensional display according to any one of claims 1 to 5, wherein a value of the w is within a range of from $[1-(1/2)(h/p_y)](3p_x/N)$ to $[1+(h/p_y)](3p_x/N)$.

7. The three-dimensional display according to any one of claims 1 to 6, wherein a value of the h is the same as or approximate to a value of the $p_y$.

8. The three-dimensional display according to any of claims 1 to 4, wherein when a distribution of a maximum intensity distribution of rays emitted from one color subpixel is represented by a function f(s, t), and a straight line, which is in parallel with the central axis of each cylindrical lens and in which a horizontal distance between the straight line and the central axis is x, is represented by $s=-t\tan\theta+x$, a sum of the light intensities within a single color subpixel on the straight line is represented by:

$$I(x) = \int_{-\infty}^{\infty} f(-t\tan\theta + x, t)dt$$

the light intensity of the entire three-dimensional pixel in the horizontal display direction φ is provided by:

$$I_s(x) = \sum_i I(x + ip_y\tan\theta) \quad \text{(I)}$$

$$\phi = \tan^{-1}(x/f)$$

wherein f is a focal distance of the cylindrical lens, and each parameter is set so that the formula (I) becomes approximately a constant value independent of x.

9. A three-dimensional display comprising:
   a two-dimensional display, which comprises a plurality of color subpixels arranged in rows extending in a horizontal direction and in columns extending in a vertical direction which is substantially perpendicular to the horizontal direction, the color subpixels of red, green and blue being arranged periodically in the columns; and
   a lenticular sheet provided on the two-dimensional display and having a plurality of cylindrical lenses through which the color subpixels are viewed and which are arranged in parallel with one another, the central axis of each cylindrical lens being inclined at an angle of θ to the column of the two-dimensional display,
   wherein, when a pitch of the color subpixels in the horizontal direction is $p_x$, a pitch of the color subpixels in the vertical direction is $p_y$, and a color subpixel group constituting one three-dimensional pixel includes 3M×N number of color subpixels where 3M is the number of color subpixels in each row corresponding to one of the cylindrical lenses and N is the number of color subpixels in each column corresponding to one of the cylindrical lenses, a relationship, $\theta=\tan^{-1}[(1-3/N)p_x/p_y]$, is satisfied, where $p_x$ is a pitch of the color subpixels in the horizontal direction and $p_y$ is a pitch of the color subpixels in the vertical direction.

10. The three-dimensional display according to claim 9, wherein the two-dimensional display that has color subpixels is selected from the group consisting of a liquid crystal display, an organic EL display, and a plasma display.

11. The three-dimensional display according to claim 9 or 10, wherein the N is the multiples of 3.

12. The three-dimensional display according to any one of claims 9 to 11, wherein, in a construction of the three-dimensional pixel, $Np_y \leq 3Mp_x$ is satisfied.

13. The three-dimensional display according to any one of claims 9 to 12, wherein when a horizontal width and a vertical width of the color subpixels are w and h respectively, $w=3p_x/N$ is satisfied.

14. The three-dimensional display according to any one of claims 9 to 13, wherein a value of the w is within a range of:

$$\{1-(1/2)(N/3-1)(h/p_y)\}(3p_x/N) \leq w \leq \{1+(N/3-1)(h/p_y)\}(3p_x/N).$$

15. The three-dimensional display according to any one of claims 9 to 14, wherein a value of the h is $3p_y/(N-3)$.

16. The three-dimensional display according to any one of claims 9 to 12, wherein, when a distribution of a maximum intensity distribution of rays emitted from one color subpixel is represented by a function f(s, t), and a straight line, which is in parallel with the central axis of each cylindrical lens and in which a horizontal distance between the straight line and the central axis is x, is represented by $s=-t\tan\theta+x$, a sum of the light intensities within a single subpixel on the straight line is represented by:

$$I(x) = \int_{-\infty}^{\infty} f(-t\tan\theta + x, t)dt$$

the light intensity of the entire three-dimensional pixel in the horizontal display direction $\phi$ is provided by:

$$I_s(x) = \sum_i I(x + i(p_x - p_y\tan\theta)) \quad \text{(II)}$$

$$\phi = \tan^{-1}(x/f)$$

wherein f is a focal distance of the cylindrical lens, and each parameter is set so that the formula (II) becomes approximately a constant value independent of x.

17. A three-dimensional display comprising:

a two-dimensional display, which comprises a plurality of color subpixels arranged in rows extending in a horizontal direction and in columns extending in a vertical direction which is substantially perpendicular to the horizontal direction, the color subpixels of red, green and blue being arranged periodically in the rows and the color subpixels of the same color being arranged in the columns;

a lenticular sheet provided on the two-dimensional display and having a plurality of cylindrical lenses through which the color subpixels are viewed and which are arranged in parallel with one another; and an aperture array which is provided between the two-dimensional display and the lenticular sheet, and which has a plurality of apertures, the central axis of each cylindrical lens being inclined at an angle of $\theta$ to the column of the two-dimensional display, wherein when a pitch of the color subpixels in the horizontal direction is $p_x$, a pitch of the color subpixels in the vertical direction is $p_y$, a pitch of the apertures in the horizontal direction is $p_x'$, a pitch of the apertures in the vertical direction is $p_y'$, and when a color subpixel group constituting one three-dimensional pixel includes 3M×N number of color subpixels where 3M is the number of color subpixels in each row corresponding to one of the cylindrical lenses and N is the number of color subpixels in each column corresponding to one of the cylindrical lenses, relationships, $p_x=p_x'$, $p_y=p_y'$, and $\theta=\tan^{-1}(3p_x'/Np_y')$, are satisfied.

18. The three-dimensional display according to claim 17, wherein the two-dimensional display that has color subpixels is selected from the group consisting of a liquid crystal display, an organic EL display, and a plasma display.

19. The three-dimensional display according to claim 17 or 18, wherein the N is the multiples of 3.

20. The three-dimensional display according to any one of claims 17 to 19, wherein, in a construction of the three-dimensional pixel, $Np_y' \leq 3Mp_x'$ is satisfied.

21. The three-dimensional display according to any one of claims 17 to 20, wherein when a horizontal width and a vertical width of the apertures are w' and h' respectively, $w'=3p_x'/N$ is satisfied.

22. The three-dimensional display according to any one of claims 17 to 21, wherein a value of the w' is within a range of from $[1-(1/2)(h'/p_y')](3p_x'/N)$ to $[1+(h'/p_y')](3p_x'/N)$.

23. The three-dimensional display according to any one of claims 17 to 22, wherein a value of the h' is the same as or approximate to a value of the $p_y'$.

24. The three-dimensional display according to any one of claims 17 to 20, wherein, when a distribution of a maximum intensity distribution of rays emitted from one aperture is represented by a function f(s, t), and a straight line, which is in parallel with the central axis of each cylindrical lens and in which a horizontal distance between the straight line and the central axis is x, is represented by $s=-t\tan\theta+x$, a sum of the light intensities within a single color subpixel on the straight line is represented by:

$$I(x) = \int_{-\infty}^{\infty} f(-t\tan\theta + x, t)dt$$

the light intensity of the entire three-dimensional pixel in the horizontal display direction $\phi$ is provided by:

$$I_s(x) = \sum_i I(x + ip_y'\tan\theta) \quad \text{(III)}$$

$$\phi = \tan^{-1}(x/f)$$

wherein f is a focal distance of the cylindrical lens, and each parameter is set so that the formula (III) becomes approximately a constant value independent of x.

25. The three-dimensional display according to any one of claims 17 to 24, wherein each of the color subpixels has a multidomain structure which is divided into top, bottom, right, and left sections.

26. The three-dimensional display according to any one of claims 17 to 25, further comprising a diffuser disposed between the two-dimensional display and the aperture array.

27. A three-dimensional display comprising:
- a two-dimensional display, which comprises a plurality of color subpixels arranged in rows extending in a horizontal direction and in columns extending in a vertical direction which is substantially perpendicular to the horizontal direction, the color subpixels of red, green and blue being arranged periodically in the columns;
- a lenticular sheet provided on the two-dimensional display and having a plurality of cylindrical lenses through which the color subpixels are viewed and which are arranged in parallel with one another; and
- an aperture array which is provided between the two-dimensional display and the lenticular sheet and has a plurality of apertures,
- the central axis of each cylindrical lens being inclined at an angle of θ to the column of the two-dimensional display,
- wherein when a pitch of the color subpixels in the horizontal direction is $p_x$, a pitch of the color subpixels in the vertical direction is $p_y$, a pitch of the apertures in the horizontal direction is $p_x'$, a pitch of the apertures in the vertical direction is $p_y'$, and when a color subpixel group constituting one three-dimensional pixel includes 3M×N number of color subpixels where 3M is the number of color subpixels in each row corresponding to one of the cylindrical lenses and N is the number of color subpixels in each column corresponding to one of the cylindrical lenses, relationships, $p_x = p_x'$, $p_y = p_y'$, and $\theta = \tan^{-1}[(1-3/N)p_x'/p_y']$, are satisfied.

28. The three-dimensional display according to claim 27, wherein the two-dimensional display that has color subpixels is selected from the group consisting of a liquid crystal display, an organic EL display, and a plasma display.

29. The three-dimensional display according to claim 27 or 28, wherein the N is the multiples of 3.

30. The three-dimensional display according to any one of claims 27 to 29, wherein, in a construction of the three-dimensional pixel, $Np_y' \leq 3Mp_x'$ is satisfied.

31. The three-dimensional display according to any one of claims 27 to 30, wherein when a horizontal width and a vertical width of the apertures are w' and h' respectively, $w' = 3p_x'/N$ is satisfied.

32. The three-dimensional display according to any one of claims 27 to 31, wherein a value of the w' is within a range of:

$$\{1-(1/2)(N/3-1)(h/p_y')\}(3p_x'/N) \leq w \leq \{1+(N/3-1)(h/p_y')\}(3p_x'/N).$$

33. The three-dimensional display according to any one of claims 27 to 32, wherein a value of the h' is $3p_y/(N-3)$.

34. The three-dimensional display according to any one of claims 27 to 30, wherein when a distribution of a maximum intensity distribution of rays emitted from one aperture is represented by a function f(s, t), and a straight line, which is in parallel with the central axis of each cylindrical lens and in which a horizontal distance between the straight line and the central axis is x, is represented by $s = -t \tan\theta + x$, a sum of the light intensities within a single subpixel on the straight line is represented by:

$$I(x) = \int_{-\infty}^{\infty} f(-t\tan\theta + x, t)dt$$

the light intensity of the entire three-dimensional pixel in the horizontal display direction φ is provided by:

$$I_s(x) = \sum_i I(x + i(p_x' - p_y' \tan\theta)) \quad \text{(IV)}$$

$$\phi = \tan^{-1}(x/f)$$

wherein f is a focal distance of the cylindrical lens,
and each parameter is set so that the formula (IV) becomes approximately a constant value independent of x.

35. The three-dimensional display according to any one of claims 27 to 34, wherein each of the color subpixels has a multidomain structure which is divided into top, bottom, right, and left sections.

36. The three-dimensional display according to any one of claims 27 to 35, further comprising a diffuser disposed between the two-dimensional display and the aperture array.

* * * * *